US012244340B2

(12) United States Patent
Li et al.

(10) Patent No.: US 12,244,340 B2
(45) Date of Patent: Mar. 4, 2025

(54) OPTICAL POWER COMMISSIONING METHOD, COMMISSIONING SYSTEM, CONTROL DEVICE, AND COMMISSIONING STATION

(71) Applicant: Huawei Technologies Co., Ltd., Shenzhen (CN)

(72) Inventors: Ping Li, Wuhan (CN); Jian Deng, Shenzhen (CN); Chunhui Chen, Dongguan (CN); Xuefeng Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 17/981,180

(22) Filed: Nov. 4, 2022

(65) Prior Publication Data

US 2023/0058069 A1 Feb. 23, 2023

Related U.S. Application Data

(63) Continuation of application No. PCT/CN2020/140048, filed on Dec. 28, 2020.

(30) Foreign Application Priority Data

May 6, 2020 (CN) .......................... 202010374475.2

(51) Int. Cl.
*H04B 10/079* (2013.01)
(52) U.S. Cl.
CPC ................. *H04B 10/07955* (2013.01); *H04B 10/07953* (2013.01)
(58) Field of Classification Search
CPC ...... H04B 10/079–0799; H04B 10/293; H04B 10/564; H04J 14/0221
(Continued)

(56) References Cited

U.S. PATENT DOCUMENTS

| | | | | |
|---|---|---|---|---|
| 2003/0058494 A1* | 3/2003 | Roberts | ............... | H04J 14/0279 398/43 |
| 2010/0049841 A1* | 2/2010 | Wang | ...................... | H04L 43/50 709/222 |

(Continued)

FOREIGN PATENT DOCUMENTS

| | | | |
|---|---|---|---|
| CN | 102142903 A | | 8/2011 |
| CN | 102201863 A | * | 9/2011 |

(Continued)

OTHER PUBLICATIONS

"Series G: Transmission Systems and Media, Digital Systems and Networks, Transmission media characteristics—Characteristics of optical components and subsystems, Spectral grids for WDM applications: CWDM wavelength grid," International Telecommunication Union, ITU-T Recommendation G.694.2, Telecommunication Standardization Sector of ITU, (Dec. 2003), 12 pages.

*Primary Examiner* — Li Liu
(74) *Attorney, Agent, or Firm* — Slater Matsil, LLP

(57) ABSTRACT

This application provides an optical power commissioning method, a commissioning system, a control device, and a commissioning station. The commissioning system includes a control device and one or more commissioning stations. The method includes the control device first identifies one or more to-be-commissioned services on which optical power commissioning needs to be performed, the control device sends, based on the to-be-commissioned service, commissioning information to the one or more commissioning stations on which the to-be-commissioned service passes through, where the one or more commissioning stations perform parallel optical power commissioning based on the commissioning information, and the one or more commissioning stations perform optical power commissioning based on the commissioning information. According to this (Continued)

application, a plurality of services and a plurality of commissioning stations can be commissioned concurrently.

16 Claims, 7 Drawing Sheets

(58) Field of Classification Search
USPC ............ 398/25–38, 136, 158, 192, 195, 197
See application file for complete search history.

(56) References Cited

U.S. PATENT DOCUMENTS

| 2014/0029937 | A1* | 1/2014 | Shi | H04B 10/07955 |
| | | | | 398/26 |
| 2014/0241715 | A1* | 8/2014 | Han | H04J 14/0221 |
| | | | | 398/38 |
| 2014/0254372 | A1* | 9/2014 | Fisher | H04L 47/10 |
| | | | | 370/235 |
| 2015/0333823 | A1* | 11/2015 | Huang | H04B 10/0795 |
| | | | | 398/25 |
| 2016/0094307 | A1* | 3/2016 | Nakamura | H04B 10/2942 |
| | | | | 398/79 |
| 2016/0156410 | A1* | 6/2016 | Guo | H04B 10/032 |
| | | | | 398/2 |
| 2016/0241936 | A1* | 8/2016 | Nagamine | H04J 14/0212 |
| 2017/0099099 | A1* | 4/2017 | Papakos | H04J 14/021 |
| 2019/0123817 | A1* | 4/2019 | Yilmaz | H04L 41/0816 |

FOREIGN PATENT DOCUMENTS

| CN | 103825651 A | 5/2014 |
| CN | 108418649 A | 8/2018 |

* cited by examiner

OPTICAL POWER COMMISSIONING METHOD, COMMISSIONING SYSTEM, CONTROL DEVICE, AND COMMISSIONING STATION

CROSS-REFERENCE TO RELATED APPLICATIONS

This application is a continuation of International Application No. PCT/CN2020/140048, filed on Dec. 28, 2020, which claims priority to Chinese Patent Application No. 202010374475.2, filed on May 6, 2020. The disclosures of the aforementioned applications are hereby incorporated by reference in their entireties.

TECHNICAL FIELD

This application relates to the communication field, and more specifically, to an optical power commissioning method, a commissioning system, a control device, and a commissioning station.

BACKGROUND

In an optical communication network, when service performance is degraded, power commissioning needs to be performed on a wavelength service. For example, if the service performance is degraded due to optical fiber cutover, optical fiber degradation, intra-station insertion loss degradation, and an improper manual operation, power commissioning needs to be performed on the wavelength service.

An existing commissioning manner is serial step-by-step commissioning based on an optical multiplex section (OMS) of a service, that is, manually selecting a to-be-commissioned service and performing distributed serial power commissioning. Specifically, from a service source to a sink, serial small-step commissioning is performed based on the OMS, to traverse to-be-commissioned services and affected services. To ensure security of an old-wavelength service, small-step trial and error commissioning is performed based on a current network power value. For a single OMS, a multiplexed wavelength of a primary optical path is first commissioned, and then a single wavelength is commissioned. In addition, to reduce impact on the old wavelength, small-step trial and error commissioning is performed, so that optical power of the old-wavelength service is locked. If the optical power fails to be locked, single-step rollback is performed. In the commissioning process, it is further monitored whether a bit error ratio (BER) exceeds a threshold.

In the existing commissioning manner, the to-be-commissioned service needs to be manually selected, and serial feedback commissioning, specifically, trial and error commissioning, small-step commissioning, and the manner of repeatedly monitoring whether the BER of the service exceeds the threshold, is performed based on a service path and the OMS. Therefore, device interaction is frequently performed, commissioning scenarios are limited, and commissioning efficiency is low.

SUMMARY

This application provides an optical power commissioning method, a commissioning system, a control device, and a commissioning station, which can implement quick and automatic parallel commissioning and improve commissioning efficiency and can be further applied to more commissioning scenarios.

According to a first aspect, an optical power commissioning method is provided. The method may be performed by a commissioning system, or may be performed by a chip or a circuit configured in the commissioning system. This is not limited in this application.

The commissioning system includes a control device and N commissioning stations, and the method includes the control device determines M to-be-commissioned services on which optical power commissioning needs to be performed. M is an integer greater than or equal to 1. The control device sends commissioning information to the N commissioning stations based on the M to-be-commissioned services. The commissioning information is used by the N commissioning stations to perform parallel optical power commissioning. The N commissioning stations are stations on which the M to-be-commissioned services are located, and N is an integer greater than or equal to 1. The N commissioning stations perform optical power commissioning based on the commissioning information.

For example, the M to-be-commissioned services correspond to X optical multiplex sections OMSs, and X is an integer greater than or equal to 1.

For example, at least one of M, N, and X is an integer greater than 1. For example, N is greater than 1. For example, the control device may determine one to-be-commissioned service, and the to-be-commissioned service passes through a plurality of commissioning stations. For another example, the control device may determine a plurality of to-be-commissioned services, and the plurality of to-be-commissioned services pass through a plurality of commissioning stations.

For example, the control device may further perform commissioning by identifying a primary optical path. Specifically, the control device identifies that optical performance data of M primary optical paths is abnormal. The control device sends commissioning information to N commissioning stations based on the foregoing exception data. The commissioning information is used by the N commissioning stations to perform parallel optical power commissioning. The N commissioning stations are stations on which the M primary optical paths are located, and both M and N are integers greater than or equal to 1. The N commissioning stations perform optical power commissioning based on the commissioning information.

Based on the foregoing technical solution, parallel commissioning may be implemented. The control device may first identify a service or a primary optical path on which optimization commissioning needs to be performed, and then send commissioning information to each commissioning station based on the service or the primary optical path on which optimization commissioning needs to be performed, so that the commissioning stations can perform parallel commissioning based on the commissioning information. The control device may control a plurality of services, a plurality of faults (in other words, optimization commissioning needs to be performed on the plurality of services), and a plurality commissioning stations together, so that automatic parallel multi-service, multi-OMS section, and multi-commissioning station optimization commissioning can be implemented, and a multi-service, multi-optical path, and multi-fault scenario can be supported. This is applicable to more commissioning scenarios. In addition, optimization commissioning can be quickly performed, and as many commissioning stations as possible can perform parallel commissioning, so that optimization commissioning efficiency is improved, and a requirement of a customer for quick and automatic optimization commissioning is met to the greatest extent. It should be noted that, in this application, the solution is described based on a scenario in which parallel optical power commissioning is performed based on a to-be-commissioned service, but this should not constitute a limitation on the application scope of this application. For example, this application may be further applied to a scenario in which the control device performs parallel commissioning based on an exception of a primary optical path.

With reference to the first aspect, in some implementations of the first aspect, the method further includes the control device receives service optical performance data reported by W stations. W is an integer greater than or equal to 1. That the control device determines M to-be-commissioned services on which optical power commissioning needs to be performed includes the control device determines the M to-be-commissioned services based on the service optical performance data reported by the W stations.

For example, W may be equal to N, or W may be greater than N.

For example, the W stations may include the N commissioning stations, that is, the N commissioning stations may actively report service optical performance data. Alternatively, the W stations may include some of the commissioning stations. After determining the M to-be-commissioned services, the control device determines the N commissioning stations through which the M to-be-commissioned services pass.

For example, the optical performance data may include but is not limited to input/output multiplexed-wavelength optical power of an optical amplifier board, single-wavelength optical power, an optical amplifier gain, an electrical variable optical attenuator (EVOA) loss value, and a service bit error ratio (BER).

Based on the foregoing technical solution, the control device may monitor network-wide service optical performance data in real time, analyze the monitored service optical performance data, and determine the services on which optimization commissioning needs to be performed. In this way, quick and automatic optimization commissioning can be implemented, manual intervention is avoided, and operation and maintenance are simplified.

With reference to the first aspect, in some implementations of the first aspect, that the control device sends commissioning information to the N commissioning stations includes the control device sends commissioning information to the N commissioning stations T times, so that the N commissioning stations perform parallel optical power commissioning based on commissioning information received each time. T is an integer greater than or equal to 1. The method further includes the N commissioning stations feed back commissioning responses to the control device after performing each time of optical power commissioning, and the control device queries real-time optical power information of the M to-be-commissioned services and an affected service based on the commissioning responses; or the N commissioning stations feed back commissioning responses to the control device after performing a $T1^{th}$ time of optical power commissioning, and the control device queries real-time optical power information of the M to-be-commissioned services and an affected service based on the commissioning responses, where T1 is an integer greater than 1 and less than or equal to T; or any one of the N commissioning stations feeds back a commissioning response to the control device after a cumulative adjustment amount of the commissioning station reaches a first threshold, and the control device queries real-time optical power information of the M to-be-commissioned services and an affected service based on the commissioning response; or the N commissioning stations feed back commissioning responses to the control device after a total cumulative adjustment amount of the N commissioning stations reaches a second threshold, and the control device queries real-time optical power information of the M to-be-commissioned services and an affected service based on the commissioning responses.

For example, after each time of commissioning, the control device may query the related optical power information of the to-be-commissioned service and the affected service. This solution may be used when T is greater than or equal to 1. When T is equal to 1, it indicates that after the commissioning station completes commissioning, the control device queries the related optical power information of the to-be-commissioned service and the affected service. When T is greater than 1, it indicates that during a plurality of times of commissioning, the control device queries the related optical power information of the to-be-commissioned service and the affected service after each time of commissioning performed by the commissioning station. In this solution, a commissioning result can be monitored in real time, so that overall commissioning efficiency can be improved, and unnecessary commissioning and time costs and calculation costs caused by unnecessary commissioning can be reduced.

For another example, the control device queries the related optical power information of the to-be-commissioned service and the affected service when a specific condition is met (for example, based on a quantity of commissioning times or a commissioning amount). For example, this solution may be used when T is greater than 1. In this example, small-step commissioning may be used during each time of commissioning, so that an excessively large adjustment amount of a single time of commissioning can be avoided, and commissioning security can be improved. In addition, time costs and calculation costs caused by frequently querying real-time optical power by the control device can also be reduced. Especially, when a network topology is relatively large and a span of network elements through which a to-be-commissioned service and an affected service pass is relatively large, an automatic parallel optimization commissioning manner in which a plurality of times of small-step delivery commissioning are performed for each station and feedback is performed when a specific condition (for example, after a specific commissioning amount is reached through accumulation) is met is considered, to reduce time of querying real-time optical power by the control device a plurality of times.

According to a second aspect, an optical power commissioning method is provided. The method may be performed by a control device, or may be performed by a chip or a circuit configured in the control device. This is not limited in this application.

The method may include the control device determines M to-be-commissioned services on which optical power commissioning needs to be performed. M is an integer greater than or equal to 1. The control device sends commissioning information to N commissioning stations based on the M to-be-commissioned services. The commissioning information is used by the N commissioning stations to perform parallel optical power commissioning. The N commissioning stations are stations on which the M to-be-commissioned services are located, and N is an integer greater than or equal to 1.

Based on the foregoing technical solution, parallel commissioning may be implemented. The control device may first identify a service on which optimization commissioning needs to be performed, and then send commissioning information to each commissioning station based on the service on which optimization commissioning needs to be performed, so that the commissioning stations can perform parallel commissioning based on the commissioning information. The control device may control a plurality of services, a plurality of faults (in other words, optimization commissioning needs to be performed on the plurality of services), and a plurality commissioning stations together, so that automatic parallel multi-service, multi-OMS section, and multi-commissioning station optimization commissioning can be implemented, and a multi-service and multi-fault scenario can be supported. This is applicable to more commissioning scenarios. In addition, optimization commissioning can be quickly performed, and as many commissioning stations as possible can perform parallel commissioning, so that optimization commissioning efficiency is improved, and a requirement of a customer for quick and automatic optimization commissioning is met to the greatest extent.

With reference to the second aspect, in some implementations of the second aspect, the method further includes the control device receives service optical performance data reported by W stations. W is an integer greater than or equal to 1. That the control device determines M to-be-commissioned services on which optical power commissioning needs to be performed includes the control device determines the M to-be-commissioned services based on the service optical performance data reported by the W stations.

With reference to the second aspect, in some implementations of the second aspect, that the control device sends commissioning information to N commissioning stations includes the control device sends commissioning information to the N commissioning stations T times, so that the N commissioning stations perform parallel optical power commissioning based on commissioning information received each time. T is an integer greater than or equal to 1. The method further includes, after each time of optical power commissioning performed by the N commissioning stations, receiving a commissioning response fed back by each commissioning station, and querying real-time optical power information of the M to-be-commissioned services and an affected service; or after the N commissioning stations perform a $T1^{th}$ time of optical power commissioning, receiving a commissioning response fed back by each commissioning station, and querying real-time optical power information of the M to-be-commissioned services and an affected service, where T1 is an integer greater than 1 and less than or equal to T; or after a cumulative adjustment amount of any one of the N commissioning stations reaches a first threshold, receiving a commissioning response fed back by each commissioning station, and querying real-time optical power information of the M to-be-commissioned services and an affected service; or after a total cumulative adjustment amount of the N commissioning stations reaches a second threshold, receiving a commissioning response fed back by each commissioning station, and querying real-time optical power information of the M to-be-commissioned services and an affected service.

With reference to the first aspect or the second aspect, in some implementations, the M to-be-commissioned services correspond to X optical multiplex sections OMSs, and X is an integer greater than or equal to 1. Before the control device sends the commissioning information to the N commissioning stations, the method further includes the control device calculates at least one of the following of each of the X OMSs: an absolute total multiplexed-wavelength adjustment amount, an absolute total single-wavelength adjustment amount, and a relative adjustment amount of each commissioning station.

For example, the absolute total multiplexed-wavelength adjustment amount is a difference between an optical amplifier gain and a multiplexed-wavelength loss.

For example, the absolute total single-wavelength adjustment amount is a value obtained by subtracting actual single-wavelength optical power from target single-wavelength optical power.

For example, a relative adjustment amount of each commissioning station is an absolute total adjustment amount of the commissioning station minus a cumulative adjustment amount of upstream commissioning stations of the commissioning station.

Based on the foregoing technical solution, considering multi-service parallel commissioning, the control device may calculate a total adjustment amount of an OMS section, and then may determine an adjustment amount of each commissioning station. In addition, considering that service-upstream optical power changes after being commissioned and service-downstream optical power also changes accordingly, through a hedge of upstream and downstream adjustment amounts, an adjustment amount of a downstream station may be an adjustment amount of optical power of each wavelength of the downstream station minus a cumulative adjustment amount of all preceding OMSs, and no separate cutoff operation needs to be performed.

With reference to the first aspect or the second aspect, in some implementations, before the control device sends the commissioning information to the N commissioning stations, the method further includes the control device calculates at least one of the following information of each of the N commissioning stations: a multiplexed-wavelength optical power adjustment amount and a single-wavelength optical power adjustment amount.

Based on the foregoing solution, steps of a primary optical path and a single wavelength are independently calculated and decoupled from each other, so that repeated calculation of a multiplexed-wavelength power adjustment amount can be avoided, a quantity of commissioning times can be reduced, and commissioning efficiency can be further improved.

With reference to the first aspect or the second aspect, in some implementations, the multiplexed-wavelength optical power adjustment amount and/or the single-wavelength optical power adjustment amount meet or meets at least one of the following: optical power adjustment amounts, on a same commissioning station, of to-be-commissioned services passing through a same OMS section in the M to-be-commissioned services are offset in positive and negative directions is less than or equal to a third threshold, and a co-directional cumulative optical power adjustment amount of N1 commissioning stations is less than or equal to a fourth threshold. The N1 commissioning stations are commissioning stations on which a same to-be-commissioned service is located, the N1 commissioning stations belong to the N commissioning stations, and N1 is an integer greater than or equal to 1.

Based on the foregoing technical solution, a limitation of a co-directional commissioning step of parallel commissioning may be considered. Specifically, considering that parallel delivery is performed for OMS sections based on a minimum step, impact on another affected wavelength is relatively small, and security is high, but commissioning efficiency is improved to a relatively small extent. If parallel delivery is performed for OMS sections based on a maximum step, because commissioning values of commissioning stations do not take effect at the same time, service interruption may be caused if commissioning values only in a same direction take effect. Therefore, a limitation of a co-directional commissioning step of parallel commissioning may be considered. In this embodiment of this application, with consideration of impact of commissioning on security of another wavelength and a requirement for commissioning performance, parallel delivery is performed based on OMS sections by considering a single-station (OMS) step constraint and an inter-station (OCH level) co-directional commissioning step constraint, so that impact on another wavelength is controllable, and parallel commissioning performance is high.

With reference to the first aspect or the second aspect, in some implementations, the method further includes the control device calculates an optical power adjustment amount of the affected service based on degradation amounts of the affected service before and after commissioning of the N commissioning stations. The affected service represents a service affected by commissioning of the N commissioning stations.

For example, the optical power adjustment amount of the affected service is determined based on a first value and a second value. The first value represents an optical signal-to-noise ratio loss value of the affected service before commissioning of the N commissioning stations, and the second value represents an optical signal-to-noise ratio loss value of the affected service after commissioning of the N commissioning stations.

Based on the foregoing technical solution, impact on an old wavelength after commissioning may be evaluated in a commissioning process. In particular, when a primary optical path is commissioned, and a fault occurs on a single wavelength, impact on a status of the single-wavelength service that is caused by commissioning the primary optical path is evaluated, so that service interruption can be avoided, and commissioning security can be further improved. Specifically, for example, to protect performance of the affected old wavelength against degradation (for example, OSNR degradation), a pre-adjustment amount of old-wavelength optical power may be calculated by comparing old-wavelength degradation amounts before and after commissioning.

With reference to the first aspect or the second aspect, in some implementations, the commissioning information includes at least one of the following: an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, and an optical power adjustment amount of the affected wavelength.

With reference to the first aspect or the second aspect, in some implementations, before the control device sends the commissioning information to the N commissioning stations, the method further includes the control device determines the commissioning information based on target optical power of each to-be-commissioned service and an expected result of commissioning.

According to a third aspect, an optical power commissioning method is provided. The method may be performed by a commissioning station, or may be performed by a chip or a circuit configured in the commissioning station. This is not limited in this application.

The method may include the commissioning station reports service optical performance data to a control device. The commissioning station receives commissioning information from the control device. The commissioning information is used by N commissioning stations to perform parallel optical power commissioning, the N commissioning stations include the commissioning station, and N is an integer greater than or equal to 1. The commissioning station performs optical power commissioning based on the commissioning information.

With reference to the third aspect, in some implementations of the third aspect, that the commissioning station receives commissioning information from the control device includes the commissioning station receives commissioning information from the control device T times. T is an integer greater than or equal to 1. The method further includes feeding back a commissioning response to the control device after each time of optical power commissioning performed by the commissioning station; or feeding back a commissioning response to the control device after the commissioning station performs a $T1^{th}$ time of optical power commissioning, where T1 is an integer greater than 1 and less than or equal to T; or feeding back a commissioning response to the control device after a cumulative adjustment amount of the commissioning station reaches a first threshold.

With reference to the third aspect, in some implementations of the third aspect, the commissioning information includes at least one of the following: an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, and an optical power adjustment amount of the affected wavelength.

According to a fourth aspect, a commissioning system is provided. The commissioning system is configured to perform the method in any possible implementation of the first aspect.

Specifically, the commissioning system includes a control device and N commissioning stations, and the control device is configured to determine M to-be-commissioned services on which optical power commissioning needs to be performed. M is an integer greater than or equal to 1. The control device is further configured to send commissioning information to the N commissioning stations based on the M to-be-commissioned services. The commissioning information is used by the N commissioning stations to perform parallel optical power commissioning. The N commissioning stations are stations on which the M to-be-commissioned services are located, and N is an integer greater than or equal to 1. The N commissioning stations are configured to perform optical power commissioning based on the commissioning information.

With reference to the fourth aspect, in some implementations of the fourth aspect, the commissioning system includes W stations, W is an integer greater than or equal to 1, and the W stations are configured to report service optical performance data to the control device. The control device is configured to determine the M to-be-commissioned services based on the service optical performance data reported by the W stations.

With reference to the fourth aspect, in some implementations of the fourth aspect, the control device is configured to send commissioning information to the N commissioning stations T times, so that the N commissioning stations perform parallel optical power commissioning based on commissioning information received each time. T is an integer greater than or equal to 1. The N commissioning stations are further configured to feed back commissioning responses to the control device after each time of optical power commissioning, and the control device is further configured to query real-time optical power information of the M to-be-commissioned services and an affected service based on the commissioning responses; or the N commissioning stations are further configured to feed back commissioning responses to the control device after a $T1^{th}$ time of optical power commissioning, and the control device is further configured to query real-time optical power information of the M to-be-commissioned services and an affected service based on the commissioning responses, where T1 is an integer greater than 1 and less than or equal to T; or any one of the N commissioning stations is further configured to feed back a commissioning response to the control device after a cumulative adjustment amount reaches a first threshold, and the control device is further configured to query real-time optical power information of the M to-be-commissioned services and an affected service based on the commissioning response; or the N commissioning stations are further configured to feed back commissioning responses to the control device after a total cumulative adjustment amount reaches a second threshold, and the control device is further configured to query real-time optical power information of the M to-be-commissioned services and an affected service based on the commissioning responses.

With reference to the fourth aspect, in some implementations of the fourth aspect, the M to-be-commissioned services correspond to X optical multiplex sections OMSs. X is an integer greater than or equal to 1. The control device is configured to calculate at least one of the following of each of the X OMSs: an absolute total multiplexed-wavelength adjustment amount, an absolute total single-wavelength adjustment amount, and a relative adjustment amount of each commissioning station.

With reference to the fourth aspect, in some implementations of the fourth aspect, the control device is configured to calculate at least one of the following information of each of the N commissioning stations: a multiplexed-wavelength optical power adjustment amount and a single-wavelength optical power adjustment amount.

With reference to the fourth aspect, in some implementations of the fourth aspect, the multiplexed-wavelength optical power adjustment amount and/or the single-wavelength optical power adjustment amount meet or meets at least one of the following: optical power adjustment amounts, on a same commissioning station, of to-be-commissioned services passing through a same OMS section in the M to-be-commissioned services are offset in positive and negative directions is less than or equal to a third threshold, and a co-directional cumulative optical power adjustment amount of N1 commissioning stations is less than or equal to a fourth threshold. The N1 commissioning stations are commissioning stations on which a same to-be-commissioned service is located, the N1 commissioning stations belong to the N commissioning stations, and N1 is an integer greater than or equal to 1.

With reference to the fourth aspect, in some implementations of the fourth aspect, the control device is configured to calculate an optical power adjustment amount of the affected service based on degradation amounts of the affected service before and after commissioning of the N commissioning stations. The affected service represents a service affected by commissioning of the N commissioning stations.

With reference to the fourth aspect, in some implementations of the fourth aspect, the commissioning information includes at least one of the following: an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, and an optical power adjustment amount of the affected wavelength.

With reference to the fourth aspect, in some implementations of the fourth aspect, the control device is configured to determine the commissioning information based on target optical power of each to-be-commissioned service and an expected result of commissioning.

According to a fifth aspect, a commissioning system is provided. The commissioning system is configured to perform the method in any possible implementation of the first aspect. Specifically, the commissioning system includes a unit configured to perform the method in any possible implementation of the first aspect.

According to a sixth aspect, a control device is provided. The control device is configured to perform the method in any possible implementation of the second aspect. Specifically, the control device includes a unit configured to perform the method in any possible implementation of the second aspect.

In a possible design, the control device includes a processing unit and a transceiver unit. The processing unit is configured to determine M to-be-commissioned services on which optical power commissioning needs to be performed. M is an integer greater than or equal to 1. The transceiver unit is configured to send commissioning information to N commissioning stations based on the M to-be-commissioned services. The commissioning information is used by the N commissioning stations to perform parallel optical power commissioning. The N commissioning stations are stations on which the M to-be-commissioned services are located, and N is an integer greater than or equal to 1.

With reference to the sixth aspect, in some implementations of the sixth aspect, the transceiver unit is further configured to receive service optical performance data reported by W stations. W is an integer greater than or equal to 1. The processing unit is configured to determine the M to-be-commissioned services based on the service optical performance data reported by the W stations.

With reference to the sixth aspect, in some implementations of the sixth aspect, the transceiver unit is further configured to send commissioning information to the N commissioning stations T times, so that the N commissioning stations perform parallel optical power commissioning based on commissioning information received each time. T is an integer greater than or equal to 1. After each time of optical power commissioning performed by the N commissioning stations, the transceiver unit is configured to receive a commissioning response fed back by each commissioning station, and the processing unit is configured to query real-time optical power information of the M to-be-commissioned services and an affected service; or after the N commissioning stations perform a T1$^{th}$ time of optical power commissioning, the transceiver unit is configured to receive a commissioning response fed back by each commissioning station, and the processing unit is configured to query real-time optical power information of the M to-be-commissioned services and an affected service, where T1 is an integer greater than 1 and less than or equal to T; or after a cumulative adjustment amount of any one of the N commissioning stations reaches a first threshold, the transceiver unit is configured to receive a commissioning response fed back by each commissioning station, and the processing unit is configured to query real-time optical power information of the M to-be-commissioned services and an affected service; or after a total cumulative adjustment amount of the N commissioning stations reaches a second threshold, the transceiver unit is configured to receive a commissioning response fed back by each commissioning station, and the processing unit is configured to query real-time optical power information of the M to-be-commissioned services and an affected service.

With reference to the sixth aspect, in some implementations of the sixth aspect, the M to-be-commissioned services correspond to X optical multiplex sections OMSs. X is an integer greater than or equal to 1. The processing unit is configured to calculate at least one of the following of each of the X OMSs: an absolute total multiplexed-wavelength adjustment amount, an absolute total single-wavelength adjustment amount, and a relative adjustment amount of each commissioning station.

With reference to the sixth aspect, in some implementations of the sixth aspect, the processing unit is configured to calculate at least one of the following information of each of the N commissioning stations: a multiplexed-wavelength optical power adjustment amount and a single-wavelength optical power adjustment amount.

With reference to the sixth aspect, in some implementations of the sixth aspect, the multiplexed-wavelength optical power adjustment amount and/or the single-wavelength optical power adjustment amount meet or meets at least one of the following: optical power adjustment amounts, on a same commissioning station, of to-be-commissioned services passing through a same OMS section in the M to-be-commissioned services are offset in positive and negative directions is less than or equal to a third threshold, and a co-directional cumulative optical power adjustment amount of N1 commissioning stations is less than or equal to a fourth threshold. The N1 commissioning stations are commissioning stations on which a same to-be-commissioned service is located, the N1 commissioning stations belong to the N commissioning stations, and N1 is an integer greater than or equal to 1.

With reference to the sixth aspect, in some implementations of the sixth aspect, the processing unit is configured to calculate an optical power adjustment amount of the affected service based on degradation amounts of the affected service before and after commissioning of the N commissioning stations. The affected service represents a service affected by commissioning of the N commissioning stations.

With reference to the sixth aspect, in some implementations of the sixth aspect, the commissioning information includes at least one of the following: an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, and an optical power adjustment amount of the affected wavelength.

With reference to the sixth aspect, in some implementations of the sixth aspect, the processing unit is configured to determine the commissioning information based on target optical power of each to-be-commissioned service and an expected result of commissioning.

According to a seventh aspect, a commissioning station is provided. The commissioning station is configured to perform the method in any possible implementation of the third aspect. Specifically, the commissioning station includes a unit configured to perform the method in any possible implementation of the third aspect.

In a possible design, the commissioning station includes a processing unit and a transceiver unit. The transceiver unit is configured to report service optical performance data to a control device. The transceiver unit is further configured to receive commissioning information from the control device. The commissioning information is used by N commissioning stations to perform parallel optical power commissioning, the N commissioning stations include the commissioning station, and N is an integer greater than or equal to 1. The processing unit is configured to perform optical power commissioning based on the commissioning information.

With reference to the seventh aspect, in some implementations of the seventh aspect, the transceiver unit is configured to receive commissioning information from the control device T times. T is an integer greater than or equal to 1. After each time of optical power commissioning performed by the commissioning station, the transceiver unit is further configured to feed back a commissioning response to the control device; or after the commissioning station performs a T1$^{th}$ time of optical power commissioning, the transceiver unit is further configured to feed back a commissioning response to the control device, where T1 is an integer greater than 1 and less than or equal to T; or after a cumulative adjustment amount of the commissioning station reaches a first threshold, the transceiver unit is further configured to feed back a commissioning response to the control device.

With reference to the seventh aspect, in some implementations of the seventh aspect, the commissioning information includes at least one of the following: an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, and an optical power adjustment amount of the affected wavelength.

According to an eighth aspect, a commissioning system is provided. The commissioning system includes the control device in any one of the foregoing aspects and the commissioning station in any one of the foregoing aspects.

According to a ninth aspect, an optical power commissioning apparatus is provided. The apparatus includes a processor, and the processor is coupled to a memory, and may be configured to execute instructions in the memory to implement the method in any possible implementation of the first aspect to the third aspect. In a possible implementation, the apparatus further includes the memory. In a possible implementation, the apparatus further includes a communication interface, and the processor is coupled to the communication interface.

In a possible implementation, the apparatus may be a commissioning system, a chip or a circuit configured in the commissioning system, or a device including the commissioning system.

In another possible implementation, the apparatus may be a control device, a chip or a circuit configured in the control device, or a device including the control device.

In another possible implementation, the apparatus may be a commissioning station, a chip or a circuit configured in the commissioning station, or a device including the commissioning station.

In the first implementation, the apparatus is a commissioning system or a device including the commissioning system. When the apparatus is a commissioning system or a device including the commissioning system, the communication interface may be a transceiver or an input/output interface. Optionally, the transceiver may be a transceiver circuit.

In the second implementation, the apparatus is a chip configured in a commissioning system. When the apparatus is a chip configured in a commissioning system, the communication interface may be an input/output interface, an interface circuit, an output circuit, an input circuit, a pin, a related circuit, or the like. The processor may also be embodied as a processing circuit or a logic circuit.

In the third implementation, the apparatus is a control device or a device including the control device. When the apparatus is a control device or a device including the control device, the communication interface may be a transceiver or an input/output interface. Optionally, the transceiver may be a transceiver circuit.

In the fourth implementation, the apparatus is a chip configured in a control device. When the apparatus is a chip configured in a control device, the communication interface may be an input/output interface, an interface circuit, an output circuit, an input circuit, a pin, a related circuit, or the like. The processor may also be embodied as a processing circuit or a logic circuit.

In the fifth implementation, the apparatus is a commissioning station or a device including the commissioning station. When the apparatus is a commissioning station or a device including the commissioning station, the communication interface may be a transceiver or an input/output interface. Optionally, the transceiver may be a transceiver circuit.

In the sixth implementation, the apparatus is a chip configured in a commissioning station. When the apparatus is a chip configured in a commissioning station, the communication interface may be an input/output interface, an interface circuit, an output circuit, an input circuit, a pin, a related circuit, or the like. The processor may also be embodied as a processing circuit or a logic circuit.

According to a tenth aspect, a computer-readable storage medium is provided. The computer-readable storage medium stores a computer program, and when the computer program is executed by an apparatus, the apparatus implements the method in any possible implementation of each of the foregoing aspects.

According to an eleventh aspect, a computer program product including instructions is provided. When the instructions are executed by an apparatus, the apparatus implements the method in any possible implementation of each of the foregoing aspects.

DETAILED DESCRIPTION OF ILLUSTRATIVE EMBODIMENTS

The following describes technical solutions of this application with reference to the accompanying drawings.

The technical solutions in embodiments of this application may be applied to various optical communication systems or optical networks, or may be applied to any communication system that requires optimization commissioning.

For ease of understanding of embodiments of this application, a communication system applicable to embodiments of this application is first described in detail with reference to FIG. 1 and FIG. 2.

Figure 1:
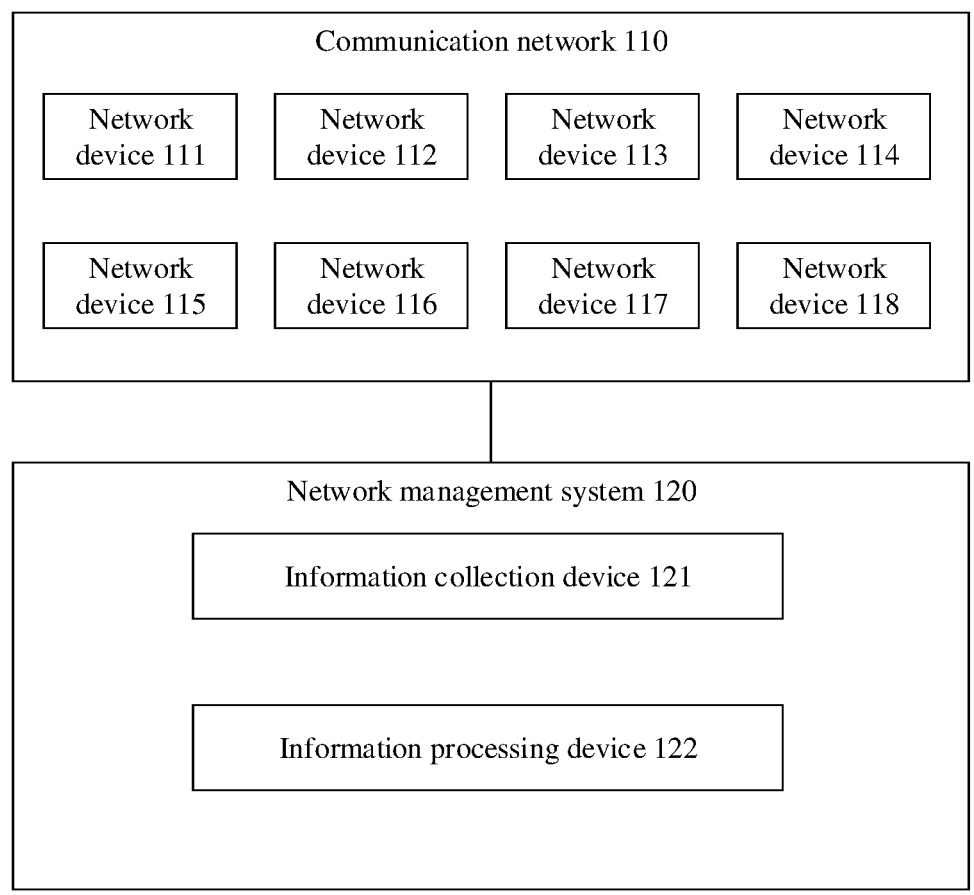
FIG. 1 and FIG. 2 are schematic diagrams of a communication system applicable to embodiments of this application.

FIG. 1 is a schematic diagram of a system architecture applicable to a method provided in embodiments of this application. It should be understood that the system architecture shown in FIG. 1 is merely an example for ease of understanding, and should not constitute a limitation on the application scope of this application.

As shown in FIG. 1, the system includes a communication network 110 and a network management system 120. The communication network 110 may include at least one network device 111 to 118, and an optical layer service can run on each network device. The network device may be understood as an object that needs to be managed in the communication network. The network device may be implemented by using software, for example, may be a virtual machine, a container, or an application; or may be implemented by using hardware such as a server, a base station, a switch, a router, a relay, a mobile terminal, a personal computer, a disk, or a solid-state drive; or may be implemented by using a combination of software and hardware. A specific form of the network device is not limited in this application. For example, the network device may be a distributed network element, and the network management system 120 may be a centralized control unit.

The network management system 120 may include an information collection device 121 and an information processing device 122. The information collection device 121 may be configured to collect and manage information, for example, optical performance data, about each network device in the communication network 110. For example, the information collection device 121 may be communicatively connected to the communication network 110, and any network device in the communication network may send optical performance data to the information collection device 121. The information collection device 121 may provide the received information for the subsequent information processing device 122, so that the information processing device 122 performs processing based on the information, for example, analyzes, based on the information, whether optical power commissioning needs to be performed.

It should be understood that, in the foregoing descriptions, the network management system 120 is divided based on different functions for ease of understanding only. However, this should not constitute any limitation on this application.

In a design, for example, the network management system 120 may be deployed on one physical device. The physical device may include one or more processors and one or more memories. The memory may store instructions. When the instructions are loaded and executed by the processor, the functions performed by the network management system 120 may be implemented. For example, the functions of the foregoing devices and modules may be separately implemented by the processor by executing corresponding instructions. Certainly, the physical device may further include an input/output interface such as a wired or wireless network interface, to communicate with the outside. The physical device may further include a component that may be configured to implement another function. For brevity, details are not described herein.

In another design, for example, the network management system 120 may be deployed on a plurality of physical devices in a distributed manner. The plurality of physical devices may constitute one device cluster. The device cluster may include one or more processors and one or more memories. The memory may store instructions. When the instructions are loaded and executed by the processor, the functions performed by the network management system 120 may be implemented.

In addition, each physical device may further include an input/output interface, so that communication between the physical devices and communication with the outside are performed. The device cluster may further include a component that may be configured to implement another function. For brevity, details are not described herein.

Figure 2:
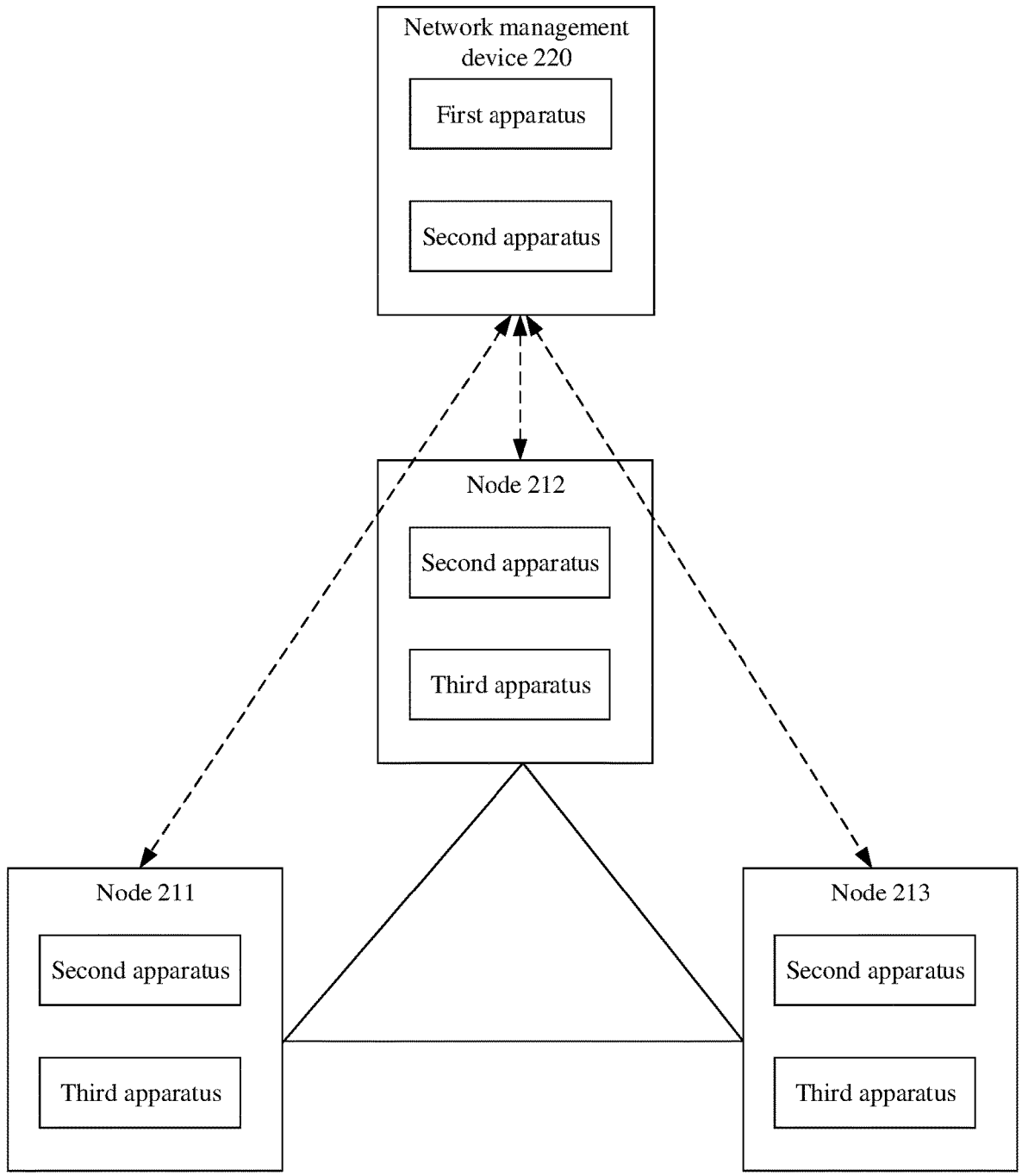

FIG. 2 is another schematic diagram of a system architecture applicable to a method provided in embodiments of this application. It should be understood that the system architecture shown in FIG. 2 is merely an example for ease of understanding, and should not constitute a limitation on the application scope of this application.

As shown in FIG. 2, the system includes one or more nodes (or stations or network elements), for example, a node 211, a node 212, and a node 213 in FIG. 2. The nodes may communicate with each other. The system may further include one or more network management devices such as a network management device 220 in FIG. 2. For example, the network management device may be a centralized control unit or an auto control center (ACC).

The network management device may include a first apparatus and a second apparatus, and the node may include a second apparatus and a third apparatus.

For example, the first apparatus may be denoted as a network optical data (OD) (NETWORK_OD) apparatus. For example, the second apparatus may be denoted as a path computation element communication protocol (PCEP) control apparatus. For example, the third apparatus may be denoted as a network element (NE) OD (NE_OD) apparatus.

For example, the first apparatus may be a brain, and control an entire parallel commissioning process. For example, the first apparatus may include four modules: an optical sensor module, a commissioning data management module, an optimization algorithm module, and an optimization control module.

The optical sensor module may collect and monitor an optical performance parameter of an OMS (or an optical path (OCH)), and upload the optical performance parameter to the commissioning data management module. For example, the optical performance parameter may include but is not limited to optical power, a bit error rate, and a bit error ratio (BER).

The commissioning data management module may implement data concatenation (for example, depending on a network topology relationship), data lifecycle management (on real-time data or historical data), data cleaning or preprocessing, or the like.

The optimization algorithm module may model the optical-performance physical parameter to calculate some commissioning information such as target optical power of a to-be-commissioned service, an optimal adjustment step of the to-be-commissioned service, and an adjustment amount of each old wavelength in affected services, and provide the commissioning information for the optimization control module for parallel commissioning.

The optimization control module may automatically identify batch performance-degraded services, control a plurality of rounds of commissioning in multi-service and multi-fault parallel commissioning for network elements, and the like For example, the second apparatus may be configured to control reporting of a real-time optical performance resource of a network and delivery of an adjustment amount. The second apparatus can ensure that the real-time optical performance resource is automatically sent to the NETWORK_OD apparatus.

For example, the third apparatus may be used for network element commissioning performance data management and network element commissioning control. Network element commissioning performance data management is millisecond optical performance data collection of a device board and management of optical performance data of an optical component in a network element service. Network element commissioning control is executing and responding to a network element commissioning action. The third apparatus can collect millisecond optical performance data in real time, and provide network real-time data for an automated system.

In this embodiment of this application, the control device may correspond to the network management device 220. The network management device 220 may be deployed on a standalone server, or may be deployed on a network element device (namely, a node). This is not limited. For example, the first apparatus may be deployed on a standalone server or on a network element device with a relatively strong capability.

In this embodiment of this application, a commissioning station may correspond to each node (or each network element) (for example, the node 211 to the node 213).

It should be understood that, in the foregoing descriptions, the network element, the network management device 220, and the first apparatus are divided based on different functions for ease of understanding only. However, this should not constitute any limitation on this application. It may be understood that although division manners are different, functions implemented by each device are still the same.

The network management device is used as an example. In a design, for example, the network management device 220 may be deployed on one physical device. The physical device may include one or more processors and one or more memories. The memory may store instructions. When the instructions are loaded and executed by the processor, the functions performed by the network management device 220 may be implemented. For example, the functions of the foregoing devices and modules may be separately implemented by the processor by executing corresponding instructions. Certainly, the physical device may further include an input/output interface such as a wired or wireless network interface, to communicate with the outside. The physical device may further include a component that may be configured to implement another function. For brevity, details are not described herein.

In another design, for example, the network management device 220 may be deployed on a plurality of physical devices in a distributed manner. The plurality of physical devices may constitute one device cluster. The device cluster may include one or more processors and one or more memories. The memory may store instructions. When the instructions are loaded and executed by the processor, the functions performed by the network management device 220 may be implemented.

For example, the first apparatus and the second apparatus listed above may be independently deployed on two physical devices. A function of each device may be implemented by a processor in each physical device executing a corresponding instruction. A function of each module in the first apparatus may be further implemented by the processor by executing a corresponding instruction. Alternatively, functions of modules in the first apparatus may be implemented by using a plurality of standalone physical devices, and each module is deployed on one physical device. This is not limited in this application. In addition, division of the modules in the first apparatus is not limited in this application.

In addition, each physical device may further include an input/output interface, so that communication between the physical devices and communication with the outside are performed. The device cluster may further include a component that may be configured to implement another function. For brevity, details are not described herein.

It should be understood that the foregoing names are only used to distinguish between different functions, but do not indicate that the first apparatus and the second apparatus are standalone physical devices, or the second apparatus and the third apparatus are standalone physical devices. Specific forms of the first apparatus, the second apparatus, and the third apparatus are not limited in this application. For example, the first apparatus, the second apparatus, and the third apparatus may be integrated into a same physical device, or may be different physical devices. In addition, the foregoing names are only used to distinguish between different functions, and should not constitute any limitation on this application. This application does not rule out a possibly of using other names in a 5G network and another future network.

It should be further understood that the system architectures shown in FIG. 1 and FIG. 2 are merely examples for ease of understanding, and should not constitute a limitation on the application scope of this application. For example, this application may be applied to any scenario in which optical communication is performed.

To facilitate understanding of embodiments of this application, the following first briefly describes some terms involved in this application.

1. Optimization commissioning: In some scenarios such as natural aging of an optical fiber and an abnormal or artificial board fault, optical power of a multiplexed wavelength may deviate from a reference value by a large range after long-term operation, resulting in general deviation of optical power of single wavelengths and optical power performance degradation. The optical power is adjusted to a nominal value by adjusting an optical amplifier gain and a variable optical attenuator loss value in a network, to ensure normal and stable running of a system.

2. Old wavelength: An old wavelength is an existing wavelength channel on a rerouting or an expansion optical path compared with a new wavelength. Adding the new wavelength affects performance of the old wavelength.

3. Old wavelength margin: An old wavelength margin is an indicator that can be used to evaluate a capability of rejecting disturbance of power, nonlinearity, and the like by the old wavelength. A larger margin indicates a stronger disturbance rejection capability.

4. Optical cross-connect: An optical cross-connect (OXC) is an optical fiber interface with a plurality of standards, and is used to perform controllable connection and reconnection between any optical fiber signal (or each wavelength signal of any optical fiber signal) and another optical fiber signal at an optical network node.

5. Optical transponder unit (OTU): An optical transponder unit is a component or a subsystem that can convert an accessed client signal into a wavelength division multiplexing (WDM) standard wavelength compliant with a standard (for example, ITU-T G.694.1/ITU-T G.694.2).

6. Wavelength selective switch (WSS): A wavelength selective switch is a new technology that can implement dynamic reconfigurable optical add-drop multiplexing or a reconfigurable optical add-drop multiplexer (ROADM), has a mesh architecture, can support any uplink or downlink function of any port wavelength, and has a function of adjusting optical power of any wavelength.

7. Optical signal-to-noise ratio (OSNR): An optical signal-to-noise ratio is an indicator that can evaluate quality of an optical signal. A larger OSNR indicates better quality of an optical signal, and a smaller OSNR indicates worse quality of an optical signal.

8. A label switching path (LSP): A label switching path is a path that is divided based on special forward error correction (FEC), that is formed by one ingress node (for example, denoted as Ingress), one egress node (for example, denoted as Egress), and one or more label switching routers (LSR), and that can be established at a label stack level for data packet transmission. The LSR is a processing device with a multi-protocol label switching (MPLS) node function, and has a capability of forwarding a layer 3 (L3) internet protocol (IP) packet. The MPLS edge node Ingress (MPLS ingress node) is configured to process IP packet traffic input to an MPLS domain. The MPLS edge node Egress (MPLS egress node) is configured to process IP packet traffic output by the MPLS domain.

In an optical communication network, when service performance is degraded, power commissioning needs to be performed on a wavelength service. For example, if the service performance is degraded due to optical fiber cutover, optical fiber degradation, intra-station insertion loss degradation, and an improper manual operation, power commissioning needs to be performed on the wavelength service.

An optical layer service starts from the OTU, and passes through numerous optical components such as an optical amplifier, an optical fiber, a WSS, an interleaver unit (ITL), a fiber interface unit (FIU), and an electrical variable optical attenuator (EVOA). Light is propagated in these optical components in a form of an analog signal. A hole-burning effect of the optical amplifier, a Raman effect of an optical fiber, and a filtering effect of the WSS/ITL cause interaction between optical signals of different channels, to finally result in a change of optical power and an OSNR.

Optimization commissioning has the following characteristics: Optical power of an optical layer network nonlinearly changes, inter-dimensional impact is caused by multi-dimensional networking (wireless mesh networking), optimization of a single dimension may cause a fault to another dimension, and if commissioning is performed on an optical path, an old wavelength transmitted in a same optical fiber is affected by a to-be-commissioned wavelength. The old wavelength is differently affected if locations, quantities, and commissioning power of to-be-commissioned wavelengths are different. The old wavelength is also differently affected if commissioning power of to-be-commissioned wavelengths at same locations and of a same quantity is different. In addition, a longer optical path shared by the to-be-commissioned wavelength and the old wavelength indicates greater impact on the old wavelength. Therefore, there is a complex impact relationship between a location of the to-be-commissioned wavelength, a quantity of to-be-commissioned wavelengths, commissioning power of the to-be-commissioned wavelength, a location of the affected old wavelength, a quantity of old wavelengths, and path configuration parameters (a quantity of spans, a span length, a component type, and the like). Wavelength channel commissioning may cause service interruption in an existing network. It is difficult to determine a commissioning sequence of mesh networking, a commissioning risk is high, and high skills are required.

At present, to ensure network performance excellence, two main manners are used for commissioning: manual commissioning and tool-based commissioning.

Manual commissioning: In an optimization commissioning process, it is necessary to control a commissioning location and step and commission an affected service. Quite high skills of operation and maintenance personnel are required, and this manner is time- and labor-consuming.

Tool-based commissioning: Serial small-step commissioning is performed based on each optical multiplex section (OMS) layer, and when a part of power of a to-be-commissioned wavelength is commissioned, power of an affected old wavelength is locked to monitor whether a service is interrupted. In OMS serial commissioning, repeat trial and error commissioning is quite time-consuming, average commissioning performance is 30 minutes/wavelength, and commissioning security is poor. There is no effective means to ensure security of a current service and other related services. Especially in a multi-service and multi-fault scenario of a mesh network, the solution is limited and cannot be used.

Figure 3:
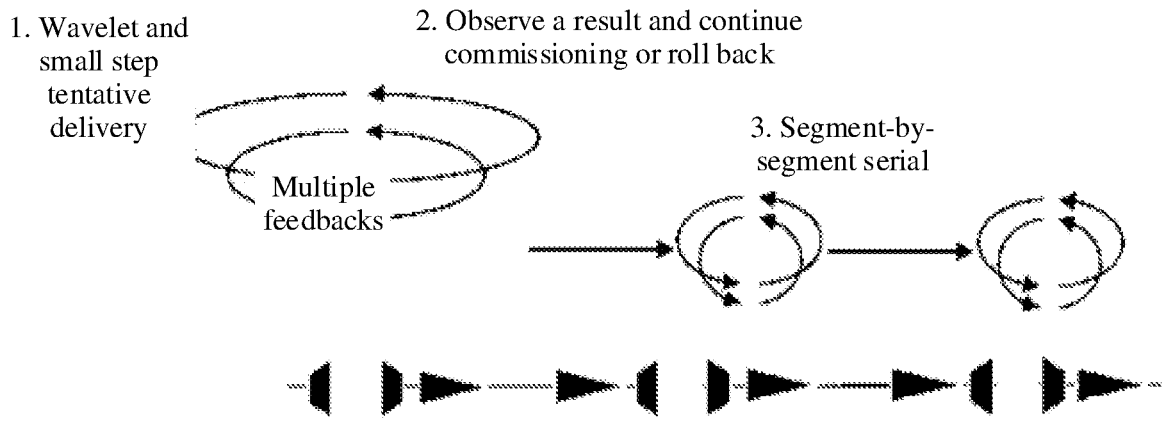
FIG. 3 is a schematic diagram of distributed serial power commissioning.

An existing commissioning manner is serial step-by-step commissioning based on an OMS section of a service, that is, manually selecting a to-be-commissioned service and performing distributed serial power commissioning, as shown in FIG. 3. From a service source to a sink, serial small-step commissioning is performed based on the OMS section, to traverse to-be-commissioned services and affected services. To ensure security of an old-wavelength service, trial and error commissioning of a small step 0.5 dB is performed based on a current network power value. For a single OMS section, a multiplexed wavelength of a primary optical path in to-be-commissioned wavelengths is first commissioned, and then a single wavelength is commissioned. After an adjustment of a total of 2 dB takes effect for the single OMS, power of an affected old wavelength is locked to reduce impact on the old wavelength. Specifically, it is ensured that power of the old wavelength remains unchanged, that is, the power of the old wavelength is adjusted at a node by a corresponding amount by which the power of the old wavelength changes after the node commissions the to-be-commissioned wavelength, so that the power of the old wavelength remains unchanged at the node. Trial and error commissioning of the small step 0.5 dB is performed, so that the optical power of the old-wavelength service is locked. If the optical power fails to be locked, single-step rollback is performed. That is, impact on a service after commissioning cannot be predicted, and therefore, commissioning can be performed at the step 0.5 dB only step by step and completed for an upstream OMS section. After a service is interrupted, rollback is immediately performed. Commissioning is attempted for the next OMS section. In other words, commissioning is continued or rollback is performed based on an observation result. In the commissioning process, it is further monitored whether a BER of the service exceeds a threshold.

In the existing commissioning manner, the to-be-commissioned service needs to be manually selected, and serial feedback commissioning, trial and error commissioning, small-step commissioning, and repeated monitoring of a receive end are performed based on a service path and the OMS. Therefore, device interaction is frequently performed, and commissioning efficiency is low. In addition, in the existing commissioning manner, impact on the old wavelength after commissioning cannot be evaluated. In particular, when a primary optical path is commissioned, and a fault occurs on a single wavelength, impact on a status of the single-wavelength service that is caused by commissioning the primary optical path is not considered. Therefore, service interruption is caused, and commissioning security cannot be ensured.

In view of this, this application provides a method, to support a multi-service and multi-fault scenario and control a plurality of services, a plurality of faults, and a plurality of commissioning stations together, thereby improving commissioning efficiency and commissioning security.

With reference to the accompanying drawings, the following describes in detail embodiments provided in this application.

Figure 4:
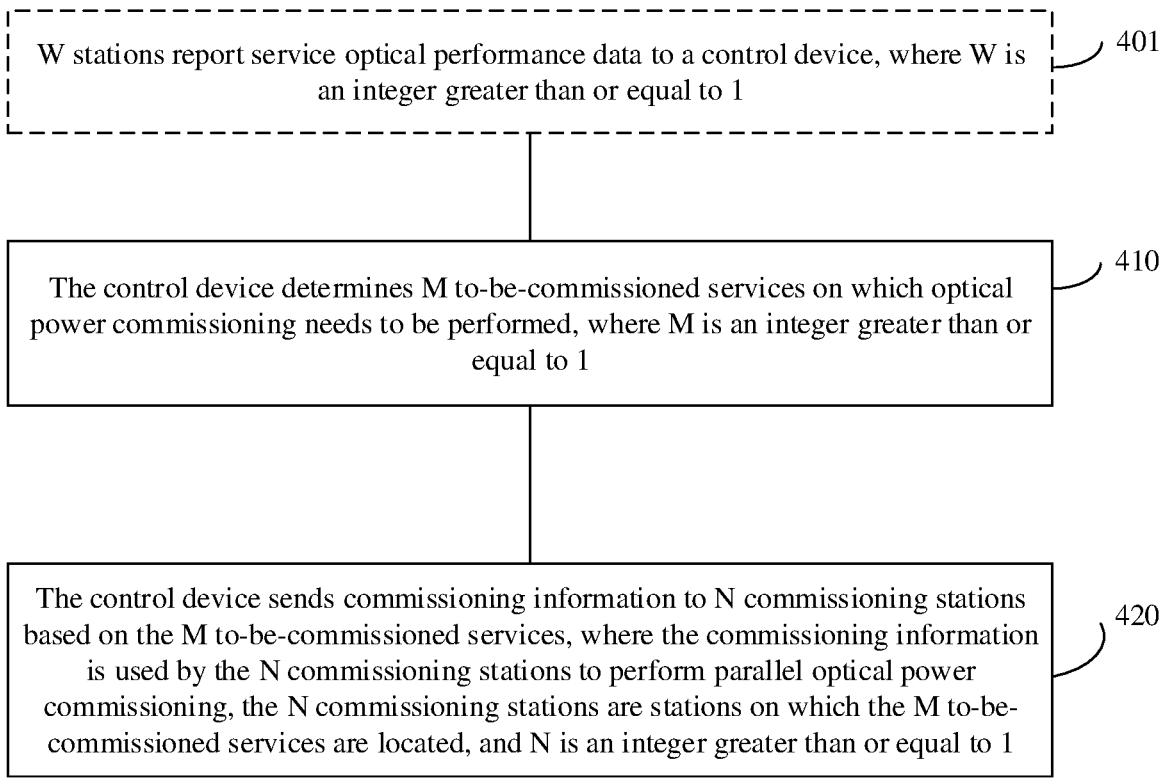
FIG. 4 is a schematic diagram of an optical power commissioning method according to an embodiment of this application.

FIG. 4 is a schematic diagram of interaction of an optical power commissioning method 400 according to an embodiment of this application. The method 400 may include the following steps.

410: A control device determines M to-be-commissioned services on which optical power commissioning needs to be performed, where M is an integer greater than or equal to 1.

The control device may identify a wavelength service on which optical power commissioning needs to be performed, or the control device may identify a wavelength service on which optimization commissioning needs to be performed, or the control device may identify a wavelength service on which optical layer commissioning needs to be performed. It may be understood that the control device may determine that optical power corresponding to some services (for example, denoted as to-be-commissioned services, where M may be, for example, an integer greater than 1) needs to be adjusted, or the control device may determine that optical power of an optical path on which some services are located needs to be adjusted.

For example, the control device may be a centralized network element, a centralized control unit, or an ACC.

For example, the control device may be the network management system in FIG. 1 or the network management device in FIG. 2. For another example, the control device may be a device on which the foregoing first apparatus (for example, the NETWORK_OD apparatus) is deployed or a device on which the foregoing first apparatus and second apparatus are deployed. It should be understood that the control device may include a plurality of modules such as an optical sensor module, a commissioning data management module, an optimization algorithm module, and an optimization control module. This is not limited in this embodiment of this application.

It should be understood that the control device is merely a name for distinguishing between different functions, and does not limit the protection scope of embodiments of this application.

A service involved in this embodiment of this application may represent a wavelength service, an optical layer service, or a service that may be carried by an optical transport network. For example, the service may be an Ethernet service, a packet service, or a wireless backhaul service. In this embodiment of this application, a service, a wavelength service, and a wavelength are sometimes interchangeably used, and are all used to represent a wavelength service. For example, both a to-be-commissioned service and a to-be-commissioned wavelength are used to represent a wavelength service on which optical power commissioning or optimization commissioning needs to be performed. For another example, an affected service or an affected wavelength is used to represent a wavelength service affected by a to-be-commissioned wavelength (namely, a wavelength on which optical power commissioning needs to be performed). One service may correspond to one OMS section, or one or more wavelengths may be used in a same OMS section.

Optionally, the control device may determine, based on service optical performance data, a plurality of to-be-commissioned services on which optical power commissioning needs to be performed.

The control device may monitor network-wide service optical performance data in real time, analyze the monitored service optical performance data, and determine the services on which optimization commissioning needs to be performed.

Optionally, before step 410, the method 400 may further include step 401.

401: W stations report the service optical performance data to the control device, where W is an integer greater than or equal to 1.

Correspondingly, the control device may determine the M to-be-commissioned services based on the service optical performance data reported by the W stations.

A network element device may actively report service optical performance data to the control device. For example, when the service optical performance data changes, the network element device may actively report the service optical performance data to the control device, so that the control device can determine, based on the reported service optical performance data, whether optical power commissioning needs to be performed.

Network element devices (for example, the W stations) collect millisecond service optical performance data in real time per station, and report single-station board optical performance data to the control device. For example, the network element device may report the single-station board optical performance data to the control device by using an extended path computation element communication protocol (PCEP). It may be understood that the control device may interact with each network element device by using a field (for example, an extended field) in a PCEP message. It should be understood that transmitting service optical performance data by using the PCEP message is merely an example for description, and this is not limited. Any manner in which the control device can obtain service optical performance data is applicable to this embodiment of this application. It should be further understood that the W stations represent stations reporting the service optical performance data, the N commissioning stations represent stations on which the to-be-commissioned services are located or through which the to-be-commissioned services pass, and the W stations may include the N commissioning stations, or the W stations may include some of the commissioning stations. This is not limited herein.

<PCEP_OTU_RX_OP_INFO>

It should be understood that the foregoing form of the extended path computation element communication protocol is merely an example description provided for ease of understanding, and a specific form of the protocol is not limited. In a future protocol, definitions or expressions used to indicate a same meaning or a same function are applicable to this embodiment of this application.

For example, the optical performance data may include but is not limited to input/output multiplexed-wavelength optical power of an optical amplifier board, single-wavelength optical power, an optical amplifier gain, an EVOA loss value, and a service BER.

In a possible implementation, the control device identifies, based on at least one of the following, a to-be-commissioned service on which optical power commissioning needs to be performed: whether multiplexed-wavelength output power of each OMS section of a service deviates from a target value, whether an OSNR loss of each service in the OMS is flat, a BER identified for a single-wavelength service, whether optical power of an OTU receive end is abnormal, and whether optical power of a transmit end is abnormal.

For example, when multiplexed-wavelength output power of each OMS section of a service deviates from the target value, it may be determined that optical power commissioning needs to be performed on the service. Optical power commissioning or optimization commissioning is performed on the service, to improve performance of the service and ensure normal and stable running of a system.

For another example, when a BER of a single-wavelength service is relatively large, for example, is greater than a preset threshold, it may be determined that optical power commissioning needs to be performed on the service. Optical power commissioning or optimization commissioning is performed on the service, to improve performance of the service and ensure normal and stable running of a system. The preset threshold may be used to determine whether optical power corresponding to the service needs to be commissioned. A value of the preset threshold is not limited in this embodiment of this application. For example, the preset threshold may be an empirical value, for example, may be determined based on a statistical value of historical data. For another example, the preset threshold may be pre-specified, for example, predefined in a protocol.

It should be understood that any manner in which the control device can identify a service on which optical power commissioning needs to be performed falls within the protection scope of embodiments of this application. For example, the control device may also monitor network-wide system performance in real time. When the system performance is relatively poor, the control device may select one or more stations for commissioning trial, and observe whether the network-wide system performance is improved.

420: The control device sends commissioning information to the N commissioning stations based on the M to-be-commissioned services. The commissioning information is used by the N commissioning stations to perform parallel optical power commissioning. The N commissioning stations are stations on which the M to-be-commissioned services are located, and N is an integer greater than or equal to 1.

Correspondingly, after receiving the commissioning information, each commissioning station may perform optical power commissioning based on the commissioning information. For example, when multiplexed-wavelength output power of an optical amplifier deviates from a target value, an optical amplifier gain or an EVOA loss value may be adjusted based on the commissioning information. For another example, when single-wavelength output optical power of the optical amplifier deviates from a target value, a WSS loss value may be adjusted based on the commissioning information.

There is no strict correspondence between the W stations and the N commissioning stations. The commissioning station represents a station on which the to-be-commissioned service is located or through which the to-be-commissioned service passes, and the W stations represent stations actively reporting the service optical performance data. In a possible case, the W stations may include the N commissioning stations.

In this embodiment of this application, parallel commissioning may be implemented. The control device may first identify a service on which optimization commissioning needs to be performed, and then send commissioning information to each commissioning station based on the service on which optimization commissioning needs to be performed, so that the commissioning stations can perform parallel commissioning based on the commissioning information. The control device may control a plurality of services, a plurality of faults (in other words, optimization commissioning needs to be performed on the plurality of services), and a plurality commissioning stations together, so that automatic parallel multi-service, multi-OMS section, and multi-commissioning station optimization commissioning can be implemented, and a multi-service and multi-fault scenario can be supported. This is applicable to more commissioning scenarios. In addition, optimization commissioning can be quickly performed, and as many commissioning stations as possible can perform parallel commissioning, so that optimization commissioning efficiency is improved, and a requirement of a customer for quick and automatic optimization commissioning is met to the greatest extent.

In this embodiment of this application, in parallel commissioning, the plurality of commissioning stations may not necessarily perform commissioning at the same time. Parallel commissioning may be understood as follows. The control device may send commissioning information to the plurality of commissioning stations in one message at the same time, and the plurality of commissioning stations may separately perform commissioning based on the received commissioning information. Alternatively, parallel commissioning may be understood as follows. Parallel commissioning may be performed for a plurality of OMS sections or by a plurality of commissioning stations.

Optionally, the control device may send commissioning information to the N commissioning stations T times. T is an integer greater than or equal to 1. In other words, the control device may send commissioning information to the N commissioning stations one or more times.

For example, the control device sends commissioning information to the N commissioning stations. After the N commissioning stations perform commissioning based on the commissioning information, if each OMS section reaches target power, the control device may no longer send commissioning information to the N commissioning stations.

For another example, the control device sends commissioning information to the N commissioning stations. After the N commissioning stations perform commissioning based on the commissioning information, if OMS sections do not reach target power, the control device may continue to send commissioning information to the N commissioning stations. Commissioning information sent each time may be the same or may be different. This is not limited. For example, after each time the commissioning station completes commissioning, the control device may recalculate commissioning information. For another example, each time the commissioning station completes commissioning, the control device does not calculate commissioning information, and may perform sending based on commissioning information calculated for the first time or based on a small step. For still another example, the commissioning station may perform commissioning a plurality of times based on commissioning information.

For still another example, the control device sends commissioning information to the N commissioning stations a plurality of times, and each time of commissioning may be performed at a small step, so that impact on an affected wavelength is reduced, and commissioning security is improved.

It may be understood that, in this embodiment of this application, the N commissioning stations may commission optical power once, or the N commissioning stations may perform optical power commissioning once; or the N commissioning stations may commission optical power a plurality of times, or the N commissioning stations may perform optical power commissioning a plurality of times.

Optionally, the control device may implement optimization algorithm modeling. Specifically, the control device may model an optical-performance physical parameter to calculate some commissioning information such as target optical power of the to-be-commissioned service, an optimal adjustment step of the to-be-commissioned service, and an adjustment amount of each old wavelength in affected services, and provide the commissioning information for the optimization control module for parallel commissioning.

For ease of understanding, an example of an optimization algorithm modeling process of a control device is described with reference to FIG. 5.

Figure 5:
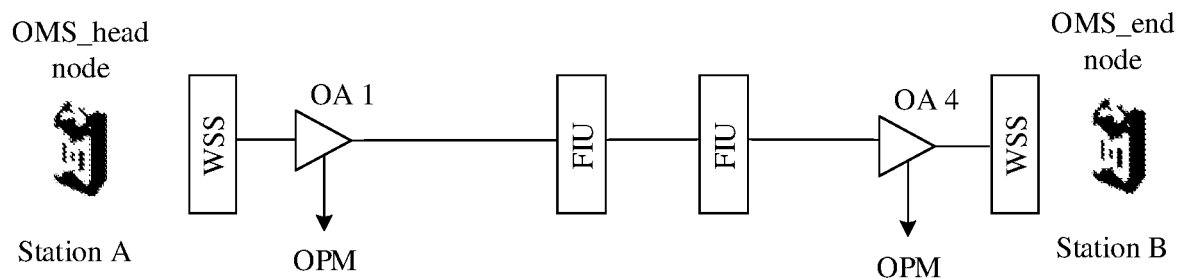
FIG. 5 is a schematic diagram of an optimization algorithm modeling process of a control device applicable to embodiments of this application.

FIG. 5 shows a single OMS section model. Two reconfigurable optical add-drop multiplexer (ROADM)/fixed optical add-drop multiplexer (FOADM) nodes can constitute one OMS section. In the OMS section, for example, an optical layer device, that is, a device that can process an optical layer signal, may include but is not limited to an optical amplifier (OA) and an optical add-drop multiplexer (OADM) (for example, an ROADM/FOADM). The OA may also be referred to as an optical line amplifier (OLA), and is mainly configured to amplify an optical signal, to support transmission over a longer distance without compromising specific performance of the optical signal. The OADM is configured to perform space transformation on an optical signal, so that the optical signal can be output from different output ports (which are sometimes referred to as directions).

Components that affect each other between wavelengths in the OMS section mainly include the optical amplifier (hole-burning effect) and an optical fiber (Raman effect). Optical performance monitors (OPM) are distributed at a head node and an end node of the OMS section, and may monitor single-wavelength optical power at the head node and the end node. That is, the optical performance monitors may monitor single-wavelength optical power of an OMS_head node and an OMS_end node shown in FIG. 5, namely, single-wavelength optical power of a station A (or a network element A) and a station B (or a network element B). When multiplexed-wavelength output power of the optical amplifier deviates from a target value, an optical amplifier gain or an EVOA loss value may be adjusted; and when single-wavelength optical power of the optical amplifier deviates from a target value, a WSS loss value may be adjusted. When optical power of each OMS section reaches target optical power, it indicates that service performance is excellent, and commissioning is completed.

Before sending commissioning information, a control device may calculate some commissioning information, so that a commissioning station can perform proper commissioning. The following describes solutions about the commissioning information in detail from the following aspects. It should be understood that content in the following aspects may be used alone, or may be used in combination. This is not limited.

Aspect 1: The control device may calculate target optical power of a to-be-commissioned service.

The target optical power is nominal optical power or expected optical power, or is optical power expected after the to-be-commissioned service is commissioned. The control device calculates the target optical power of the to-be-commissioned service. When each OMS section reaches target power, or optical power of each OMS section is adjusted to target optical power, it indicates that the commissioning is completed.

Optionally, the control device may separately calculate target primary-optical-path or multiplexed-wavelength optical power and target single-wavelength optical power.

For example, the target primary-optical-path optical power may be calculated for a primary optical path on the OMS section based on a rule that an optical amplifier gain is used to compensate for a line loss. It may be understood that the target primary-optical-path optical power is calculated for a primary optical path on each OMS section based on the rule that an optical amplifier gain is used to compensate for a line loss.

For another example, the target single-wavelength optical power is an OMS transmit-end single-wavelength optical power in a case of OSNR loss equalization that is calculated based on a currently monitored value. It may be understood that for a single service, the OMS transmit-end single-wavelength optical power in the case of OSNR loss equalization is calculated based on the currently monitored value and used as the target optical power.

Aspect 2: The control device may calculate a total adjustment amount.

Considering multi-service parallel commissioning, the control device may calculate the total adjustment amount of the OMS section, and then may determine an adjustment amount of each commissioning station.

For example, an absolute total adjustment amount of the OMS section is calculated.

For example, an absolute total primary-optical-path adjustment amount of the OMS section may be a difference between an optical amplifier gain and a multiplexed-wavelength loss. That is, the difference between the optical amplifier gain and the optical-path loss value of a primary optical path on the OMS section is calculated, and the difference is the absolute total optical-path adjustment amount.

For another example, an absolute total single-wavelength adjustment amount of the OMS section may be a value obtained by subtracting actual single-wavelength optical power from target single-wavelength optical power. That is, the value obtained by subtracting the actual single-wavelength optical power from the target single-wavelength optical power on the OMS section is calculated, and the value is the absolute total single-wavelength adjustment amount.

Optionally, the control device may determine the adjustment amount of each commissioning station based on the absolute total adjustment amount of the OMS section. For ease of understanding, an example is described.

It is assumed that to-be-commissioned services pass through an OMS section, commissioning stations on which the to-be-commissioned services on the OMS section are located include a commissioning station A and a commissioning station B, and an absolute total adjustment amount of the OMS section is P. For example, an adjustment amount of each of the commissioning station A and the commissioning station B may be P/2. For another example, a proportion of adjustment amounts of the commissioning station A and the commissioning station B is a preset proportion. For example, an adjustment amount of the commissioning station A is a*P, and an adjustment amount of the commissioning station B is (1−a)*P; or an adjustment amount of the commissioning station A is (1−b)*P, and an adjustment amount of the commissioning station B is b*P, where a and b are numbers greater than or equal to 0 and less than or equal to 1. It should be understood that values of the adjustment amounts of the commissioning station A and the commissioning station B are not limited.

For another example, a relative total adjustment amount of the OMS section is calculated.

For example, a relative adjustment amount of a commissioning station may be an absolute total adjustment amount of the commissioning station minus a cumulative adjustment amount of all upstream commissioning stations of the commissioning station.

Upstream or downstream: A source device A transmits data to a destination device B, the data passes through a device M, and the device M is located between the device A and the device B in a data transmission direction. In this case, the device A is in an upstream direction of the device M, and the device B is in a downstream direction of the device M.

In this example, the control device may determine the adjustment amount of each commissioning station based on the relative total adjustment amount of the OMS section. For ease of understanding, an example is described.

It is assumed that to-be-commissioned services pass through an OMS section, commissioning stations on which the to-be-commissioned services on the OMS section are located include a commissioning station A and a commissioning station B, and a relative total adjustment amount of the OMS section is P', for example, a proportion of an adjustment amount of the commissioning station A to an adjustment amount of the commissioning station B is P'. In this case, the adjustment amount of the commissioning station A may be x*P', and the adjustment amount of the commissioning station B is P'; or one of the commissioning stations performs commissioning at a small step such as 0.5 dB, and an adjustment amount of the other commissioning station may be determined based on P' and 0.5. It should be understood that values of the adjustment amounts of the commissioning station A and the commissioning station B are not limited.

Considering that service-upstream optical power changes after being commissioned and service-downstream optical power also changes accordingly, through a hedge of upstream and downstream adjustment amounts, an adjustment amount of a downstream station may be an adjustment amount of optical power of each wavelength of the downstream station minus a cumulative adjustment amount of all preceding OMSs, and no separate cutoff operation needs to be performed.

Based on the foregoing solution, steps of a primary optical path and a single wavelength are independently calculated and decoupled from each other, so that repeated calculation of a multiplexed-wavelength power adjustment amount can be avoided, a quantity of commissioning times can be reduced, and commissioning efficiency can be further improved.

Optionally, in this embodiment of this application, the adjustment amount of each commissioning station may be determined based on the absolute total adjustment amount of the OMS section or the relative adjustment amount of the OMS section, or the adjustment amount of each commissioning station may be jointly determined based on the absolute total adjustment amount of the OMS section and the relative adjustment amount of the OMS section. This is not strictly limited.

Aspect 3: The control device may calculate an adjustment step of a to-be-commissioned service.

For example, the control device may calculate an optimal adjustment step of the to-be-commissioned service.

It may be understood that if parallel delivery is performed for OMS sections based on a minimum step, impact on another affected wavelength is relatively small, and security is high, but commissioning efficiency is improved to a relatively small extent. If parallel delivery is performed for OMS sections based on a maximum step, because commissioning values of commissioning stations do not take effect at the same time, service interruption may be caused if commissioning values only in a same direction take effect. Therefore, a limitation of a co-directional commissioning step of parallel commissioning may be considered. In this embodiment of this application, with consideration of impact of commissioning on security of another wavelength and a requirement for commissioning performance, parallel delivery is performed based on OMS sections by considering a single-station (OMS) step constraint and an inter-station (OCH level) co-directional commissioning step constraint, so that impact on another wavelength is controllable, and parallel commissioning performance is high.

In a possible implementation, with consideration of impact of commissioning on security of another wavelength and a requirement for commissioning performance, commissioning steps of commissioning stations may be delivered in parallel based on OMS sections by considering a single-station step constraint and an inter-station co-directional commissioning step constraint.

Example 1: Single-station (OMS) step constraint (namely, an OMS section dimension): Commissioning steps of a plurality of to-be-commissioned services passing through the OMS section on a same commissioning station are offset in positive and negative directions does not exceed a third threshold.

The third threshold may be used to determine whether a commissioning step on the commissioning station is proper.

For example, the third threshold may be used for comparison with a multiplexed-wavelength commissioning step on the commissioning station and a single-wavelength commissioning step on the commissioning station. If a step value obtained by offsetting multiplexed-wavelength commissioning steps of a plurality of to-be-commissioned services on a commissioning station in positive and negative directions is excessively large and exceeds the third threshold, it indicates that the multiplexed-wavelength commissioning steps of the plurality of to-be-commissioned services on the commissioning station are improper or are not optimal. If a step value obtained by offsetting single-wavelength commissioning steps of a plurality of to-be-commissioned services on a commissioning station in positive and negative directions is excessively large and exceeds the third threshold, it indicates that the single-wavelength commissioning steps of the plurality of to-be-commissioned services on the commissioning station are improper or are not optimal.

In this embodiment of this application, one third threshold is used as an example for description, and this is not limited. For example, two third thresholds may be alternatively included, where one third threshold is used for comparison with a multiplexed-wavelength commissioning step on a commissioning station, and the other third threshold is used for comparison with a single-wavelength commissioning step on the commissioning station.

No limitation is imposed on an "equal" case in this embodiment of this application. For example, the third threshold may be used for comparison with a multiplexed-wavelength commissioning step on a commissioning station. When a step value obtained by offsetting multiplexed-wavelength commissioning steps of a plurality of to-be-commissioned services on the commissioning station in positive and negative directions is equal to the third threshold, it may be considered that the multiplexed-wavelength commissioning steps of the plurality of to-be-commissioned services on the commissioning station are proper, or it may be considered that the multiplexed-wavelength commissioning steps of the plurality of to-be-commissioned services on the commissioning station are improper.

A value of the third threshold is not limited in this embodiment of this application. For example, the third threshold may be an empirical value, for example, may be determined based on a statistical value of historical data. For another example, the third threshold may be pre-specified, for example, predefined in a protocol.

Example 2: Inter-station (OCH level) step constraint (namely, an OCH service dimension): A co-directional cumulative step of all network elements through which a same service passes does not exceed a fourth threshold.

The fourth threshold may also be used to determine whether a commissioning step of a to-be-commissioned service on each commissioning station is proper.

For example, the fourth threshold may be used for comparison with a co-directional cumulative step of all commissioning stations through which a same service passes. If the co-directional cumulative step of all the commissioning stations through which the same service passes is excessively large and exceeds the fourth threshold, it indicates that commissioning steps of the to-be-commissioned service on the commissioning stations are improper or are not optimal.

No limitation is imposed on an "equal" case in this embodiment of this application. When a co-directional cumulative step of all commissioning stations through which a same service passes is equal to the fourth threshold, it may be considered that commissioning steps of the to-be-commissioned service on all the commissioning stations are improper, or it may be considered that commissioning steps of the to-be-commissioned service on all the commissioning stations are proper.

A value of the fourth threshold is not limited in this embodiment of this application. For example, the fourth threshold may be an empirical value, for example, may be determined based on a statistical value of historical data. For another example, the fourth threshold may be pre-specified, for example, predefined in a protocol.

Based on the foregoing Example 1 and Example 2, a cumulative step of a plurality of services on a single station (including multiplexed-wavelength and single-wavelength adjustment amounts) and a co-directional cumulative step of an OCH service on commissioning stations may be comprehensively considered. For example, if a value obtained by offsetting commissioning steps of a plurality of to-be-commissioned services passing through an OMS section on a same commissioning station in positive and negative directions exceeds the third threshold, and a co-directional cumulative step of all network elements through which a same service passes exceeds the fourth threshold, adjustment amounts of all commissioning stations may be adjusted based on a proportion, to determine optimal primary-optical-path (namely, multiplexed-wavelength) and single-wavelength commissioning steps of a single commissioning station this time. For another example, if a value obtained by offsetting commissioning steps of a plurality of to-be-commissioned services passing through an OMS section on a same commissioning station in positive and negative directions exceeds the third threshold, or a co-directional cumulative step of all network elements through which a same service passes exceeds the fourth threshold, adjustment amounts of all commissioning stations may be adjusted based on a proportion, to determine optimal primary-optical-path (namely, multiplexed-wavelength) and single-wavelength commissioning steps of a single commissioning station this time.

Optionally, the control device may deliver commissioning information a plurality of times. For example, each time the control device delivers commissioning information, the control device may calculate a preferred or an optimal adjustment step of a to-be-commissioned service. For example, calculation is performed based on Example 1 and Example 2. For another example, when commissioning is performed a plurality of times, small-step commissioning may be used during a single time of commissioning, so that commissioning security can be improved.

Based on the foregoing solution, a single-OMS step constraint, an OCH-level co-directional commissioning step constraint, small-step commissioning, and a plurality of times of small-step delivery commissioning are considered, so that a considerable performance fluctuation caused by an excessively large adjustment amount delivered once is avoided, thereby improving commissioning security. In addition, the solution of Aspect 3 can provide hedge assurance, that is, parallel commissioning implements a small-step hedge of upstream and downstream power to avoid a fluctuation. In addition, the solution of Aspect 3 can further provide assurance for a case in which co-directional commissioning values take effect, that is, considering asynchronous communication of network elements, a co-directional step constraint is limited.

Aspect 4: The control device may calculate an adjustment step of an affected service.

The affected service, an affected wavelength service, or an affected old-wavelength service is used to represent a wavelength service affected by a to-be-commissioned wavelength (namely, a wavelength on which optical power commissioning needs to be performed).

For example, the control device may calculate an optimal adjustment step of the affected service.

In this embodiment of this application, to protect performance of the affected old wavelength against degradation (for example, OSNR degradation), a pre-adjustment amount of old-wavelength optical power may be calculated by comparing old-wavelength degradation amounts before and after commissioning.

A commissioning value of the affected old wavelength cannot be accurately calculated before the to-be-commissioned service is commissioned for the first time. To improve accuracy, after the first time of commissioning of the to-be-commissioned wavelength takes effect, a degradation amount of the affected old wavelength may be calculated, and repeated iterations are performed until the affected old wavelength is not degraded, so that accuracy of a pre-adjustment amount of optical power of the affected old wavelength can be improved.

For example, historical optical-amplifier OSNR loss values of the affected old-wavelength service on a plurality of commissioning stations are recorded. After the first time of parallel service commissioning takes effect, real-time optical-amplifier OSNR loss values of the affected old-wavelength service on the plurality of commissioning stations may be obtained, a difference between the two may be calculated, and single-wavelength commissioning steps of the affected old-wavelength service on the plurality of commissioning stations may be determined.

For example, the single-wavelength commissioning steps of the affected old-wavelength service on the plurality of commissioning stations may be differences between the historical optical-amplifier OSNR loss values of the affected old-wavelength service and the real-time optical-amplifier OSNR loss values of the affected old-wavelength service. The historical optical-amplifier OSNR loss values of the affected old-wavelength service represent the historical optical-amplifier OSNR loss values of the affected old-wavelength service on the plurality of commissioning stations, for example, recorded optical-amplifier OSNR losses of the affected old-wavelength service on the plurality of commissioning stations before the first time of parallel service commissioning. The real-time optical-amplifier OSNR loss values of the affected old-wavelength service represent the real-time optical-amplifier OSNR loss values of the affected old-wavelength service on the plurality of commissioning stations after the first time of parallel service commissioning takes effect.

Based on the foregoing solution, parallel commissioning reliability and security can be ensured, and further, impact on the affected old-wavelength service can be reduced, security of the affected old-wavelength service can be ensured to the greatest extent, and overall system performance can be improved.

Aspect 5: Format of the commissioning information

Optionally, after calculating the commissioning information, the control device may deliver commissioning values or adjustment amounts to N commissioning stations in parallel based on commissioning locations and commissioning steps, so that the commissioning stations perform optical power commissioning, optimization commissioning, or optical layer commissioning.

For example, a PCEP path computation LSP update request (PCUpd) message may be extended, to package commissioning information (or multi-fault information) of current commissioning in one message and send the message to a same destination station. For example, the commissioning information may include but is not limited to at least one of the following information: an optical amplifier gain, an optical amplifier gain adjustment amount, and an adjustment node; an EVOA loss, an optical loss adjustment amount, and an adjustment node; a wavelength channel number, a WSS single-wavelength adjustment amount, and an adjustment node of a to-be-commissioned wavelength; and a wavelength channel number, a WSS single-wavelength adjustment amount, and an adjustment node of an affected wavelength.

The adjustment node represents a commissioning station. From the adjustment node information, commissioning stations corresponding to corresponding adjustment amounts can be learned.

A single-wavelength adjustment node needs to be carried in an LSP attribute.

In addition, a quantity of affected old wavelengths in one OMS section indicates a quantity of affected old wavelengths that need to be pre-adjusted. For example, an adjustment step of each affected old wavelength may be determined based on the solution of Aspect 4.

For example, the commissioning information includes an optical amplifier gain, an optical amplifier gain adjustment amount, and an adjustment node. Correspondingly, after receiving the commissioning information, the adjustment node (namely, a commissioning station) may determine a primary-optical-path or multiplexed-wavelength adjustment amount based on the commissioning information. In other words, the adjustment node (namely, the commissioning station) commissions primary-optical-path or multiplexed-wavelength optical power based on the optical amplifier gain adjustment amount.

For example, the commissioning information includes a wavelength channel number, a WSS single-wavelength adjustment amount, and an adjustment node of a to-be-commissioned wavelength. Correspondingly, after receiving the commissioning information, the adjustment node (namely, a commissioning station) may determine a to-be-commissioned wavelength and an adjustment amount of the to-be-commissioned wavelength based on the commissioning information. In other words, the adjustment node (namely, the commissioning station) commissions optical power of the to-be-commissioned wavelength based on the WSS single-wavelength adjustment amount.

For example, the commissioning information includes a wavelength channel number, a WSS single-wavelength adjustment amount, and an adjustment node of an affected wavelength. Correspondingly, after receiving the commissioning information, the adjustment node (namely, a commissioning station) may determine an affected old wavelength and an adjustment amount of the affected old wavelength based on the commissioning information. In other words, the adjustment node (namely, the commissioning station) adjusts optical power of the affected old wavelength based on the WSS single-wavelength adjustment amount, to reduce impact of a to-be-commissioned wavelength on the affected old wavelength and ensure security of the affected old wavelength to the greatest extent.

It should be understood that the foregoing examples are merely examples for description, and do not constitute a limitation.

The foregoing describes solutions about the commission information in five aspects. This is not limited in this embodiment of this application. For example, the content in the foregoing aspects may be used alone, or may be used in combination. For another example, the control device may further determine more commissioning information, so that the commissioning station can perform optical power commissioning or optimization commissioning based on the commissioning information.

Optionally, in this embodiment of this application, the control device may further query related optical power information of the to-be-commissioned service and the affected service.

After the commissioning station performs optimization commissioning based on the commissioning information, the commissioning station may feed back a response indicating that current commissioning is completed to the control device. For example, the response may be denoted as a commissioning response. Correspondingly, the control device may query the related optical power information of the to-be-commissioned service and the affected service based on the commissioning response that is fed back, to determine whether optimization commissioning is completed, whether further commissioning needs to be performed, or the like. Specifically, the following two solutions may be included.

Solution 1: After each time of commissioning, the control device queries the related optical power information of the to-be-commissioned service and the affected service.

In this solution, after completing current commissioning, the commissioning station may feed back a commissioning response indicating that the commissioning is completed to the control device.

In a possible case, after receiving the commissioning response, the control device actively queries the related optical power information of the to-be-commissioned service and the affected service, and may continue to perform processing in Aspect 1 to Aspect 5. An actual power value of the to-be-commissioned service gradually approaches a target value, and finally, a difference between service multiplexed-wavelength or single-wavelength optical power of each OMS section and target optical power falls within a specific value range. In this case, it indicates that the current service optimization commissioning is completed.

In another possible case, after receiving the commissioning response, the control device actively queries the related optical power information of the to-be-commissioned service and the affected service, and a difference between service multiplexed-wavelength or single-wavelength optical power of each OMS section and target optical power falls within a specific value range. In this case, it indicates that the current service optimization commissioning is completed.

For example, when the difference between the service multiplexed-wavelength or single-wavelength optical power of each OMS section and the target optical power is less than or equal to 0.5 dB, it indicates that the current service optimization commissioning is completed. It should be understood that 0.5 dB is merely an example for description, and this is not limited in this embodiment of this application.

Based on Solution 1, a commissioning result can be monitored in real time, so that overall commissioning efficiency can be improved, and unnecessary commissioning and time costs and calculation costs caused by unnecessary commissioning can be reduced.

Solution 2: When a specific condition is met, the control device queries the related optical power information of the to-be-commissioned service and the affected service.

That is, the control device does not need to query the related optical power information of the to-be-commissioned service and the affected service after each time of commissioning or each round of commissioning of the commissioning station. When the specific condition is met, the control device may query the related optical power information of the to-be-commissioned service and the affected service, to reduce a waste of time and impact on the service.

In a possible case, when a quantity of commissioning times reaches a preset quantity of times, the control device queries the related optical power information of the to-be-commissioned service and the affected service.

For example, when a quantity of commissioning times of any commissioning station reaches a preset quantity of times, the control device may query the related optical power information of the to-be-commissioned service and the affected service.

For another example, when a total quantity of commissioning times of all commissioning stations reaches a preset quantity of times, the control device may query the related optical power information of the to-be-commissioned service and the affected service.

It should be understood that the preset quantity of times may be used to determine whether the control device needs to query the related optical power information of the to-be-commissioned service and the affected service.

For example, the preset quantity of times may be used for comparison with a quantity of commissioning times of any commissioning station or the total quantity of commissioning times of all the commissioning stations. For example, taking any commissioning station as an example, if a quantity of commissioning times of any commissioning station reaches the preset quantity of times, after current commissioning ends, the control device may query the related optical power information of the to-be-commissioned service and the affected service. For another example, taking all the commissioning stations as an example, if the quantity of commissioning times of all the commissioning stations reaches the preset quantity of times, after current commissioning ends, the control device may query the related optical power information of the to-be-commissioned service and the affected service.

It should be understood that the preset quantity of times compared with a quantity of commissioning times of any commissioning station and the preset quantity of times compared with the quantity of commissioning times of all the commissioning stations may be different, or may be the same, and there is no strict relationship between the two preset quantities of times. In other words, one preset quantity of times may be set, and the preset quantity of times is used for comparison with a quantity of commissioning times of any commissioning station; or one preset quantity of times may be set, and the preset quantity of times is used for comparison with the quantity of commissioning times of all the commissioning stations.

A value of the preset quantity of times is not limited in this embodiment of this application. For example, the preset quantity of times may be an empirical value, for example, may be determined based on a statistical value of historical data. For another example, the preset quantity of times may be pre-specified, for example, predefined in a protocol.

In another possible case, when a commissioning amount reaches a preset commissioning amount, the control device queries the related optical power information of the to-be-commissioned service and the affected service.

For example, when a commissioning amount of any commissioning station reaches a first threshold, the control device may query the related optical power information of the to-be-commissioned service and the affected service.

For another example, when a total commissioning amount of all commissioning stations reaches a second threshold, the control device may query the related optical power information of the to-be-commissioned service and the affected service.

It should be understood that the preset commissioning amount (for example, the first threshold and the second threshold) may be used to determine whether the control device needs to query the related optical power information of the to-be-commissioned service and the affected service.

For example, the first threshold may be used for comparison with a commissioning amount of any commissioning station, or the second threshold may be used for comparison with the total commissioning amount of all the commissioning stations. For example, taking any commissioning station as an example, if a commissioning amount of any commissioning station reaches the first threshold, after current commissioning ends, the control device may query the related optical power information of the to-be-commissioned service and the affected service. For another example, taking all the commissioning stations as an example, if the total commissioning amount of all the commissioning stations reaches the second threshold, after current commissioning ends, the control device may query the related optical power information of the to-be-commissioned service and the affected service.

It should be understood that the first threshold compared with a commissioning amount of any commissioning station and the second threshold compared with the total commissioning amount of all the commissioning stations may be different, or may be the same, and there is no strict relationship between the first threshold and the second threshold. In other words, one first threshold may be set, and the first threshold is used for comparison with a commissioning amount of any commissioning station; or one second threshold may be set, and the second threshold is used for comparison with the total commissioning amount of all the commissioning stations.

A value of the preset commissioning amount is not limited in this embodiment of this application. For example, the preset commissioning amount may be an empirical value, for example, may be determined based on a statistical value of historical data. For another example, the preset commissioning amount may be pre-specified, for example, predefined in a protocol.

The foregoing two cases are described as examples, and this embodiment of this application is not limited thereto. For example, the foregoing two cases may be used alone, or may be used in combination. This is not limited.

In Solution 2, when the specific condition is met, the control device queries the related optical power information of the to-be-commissioned service and the affected service, and may continue to perform processing in Aspect 1 to Aspect 5. The actual power value of the to-be-commissioned service gradually approaches the target value, and finally, the difference between the service multiplexed-wavelength or single-wavelength optical power of each OMS section and the target optical power falls within the specific value range. In this case, it indicates that the current service optimization commissioning is completed. Alternatively, when the specific condition is met, the control device queries the related optical power information of the to-be-commissioned service and the affected service, and the difference between the service multiplexed-wavelength or single-wavelength optical power of each OMS section and the target optical power falls within the specific value range. In this case, it indicates that the current service optimization commissioning is completed.

For example, when the difference between the service multiplexed-wavelength or single-wavelength optical power of each OMS section and the target optical power is less than or equal to 0.5 dB, it indicates that the current service optimization commissioning is completed. It should be understood that 0.5 dB is merely an example for description, and this is not limited in this embodiment of this application.

In Solution 2, the commissioning station may feed back a commissioning response after each time of commissioning is completed, or may feed back a commissioning response when the specific condition is met.

Based on Solution 2, a commissioning step of the to-be-commissioned service may be calculated without using the solution in Aspect 3. Small-step commissioning may be used during each time of commissioning, so that an excessively large adjustment amount of a single time of commissioning can be avoided, and commissioning security can be improved. In addition, time costs and calculation costs caused by frequently querying real-time optical power by the control device can also be reduced. Especially, when a network topology is relatively large and a span of network elements through which a to-be-commissioned service and an affected service pass is relatively large, an automatic parallel optimization commissioning manner in which a plurality of times of small-step delivery commissioning are performed for each station and feedback is performed when a specific condition (for example, after a specific commissioning amount is reached through accumulation) is met is considered, to reduce time of querying real-time optical power by the control device a plurality of times. In addition, small-step delivery is performed for each commissioning station, and an adjustment amount delivered at a small step for the second time may carry an adjustment amount of the affected service, so that security of the old-wavelength service is ensured.

The foregoing describes in detail the parallel commissioning solution provided in this embodiment of this application. The parallel optimization commissioning method may be applied to a service provisioning scenario, and optimization commissioning is supplemented with low-power parallel wavelength adding, so that automatic optimization commissioning can be implemented, and service performance can be quickly improved. The parallel optimization commissioning method may be further applied to a rerouting scenario, and optimization commissioning is supplemented with low-power parallel wavelength adding, so that a new service can be quickly provisioned while security of an old wavelength is ensured. In this embodiment of this application, a service optimization commissioning solution in a complex scenario in which there are a plurality of wavelength services and a plurality of faults and multi-point coupling degradation of a single wavelength and a primary optical path occurs can be provided, so that the solution is applicable to more commissioning scenarios. Based on the parallel commissioning solution provided in this embodiment of this application, a service interruption problem caused by single-point serial commissioning can be resolved. In addition, in some embodiments, impact on upstream and downstream OMS sections is considered together, so that a relative adjustment amount of each commissioning station is calculated, and upstream and downstream adjustment amounts naturally hedge against each other. Centralized protocol control is performed to implement multi-service (for example, the control device controls a plurality of services), multi-OMS section, and multi-commissioning station parallel optimization commissioning, so that commissioning efficiency and security are greatly improved.

For ease of understanding, the following describes a possible complete procedure by using a specific example.

Figure 6:
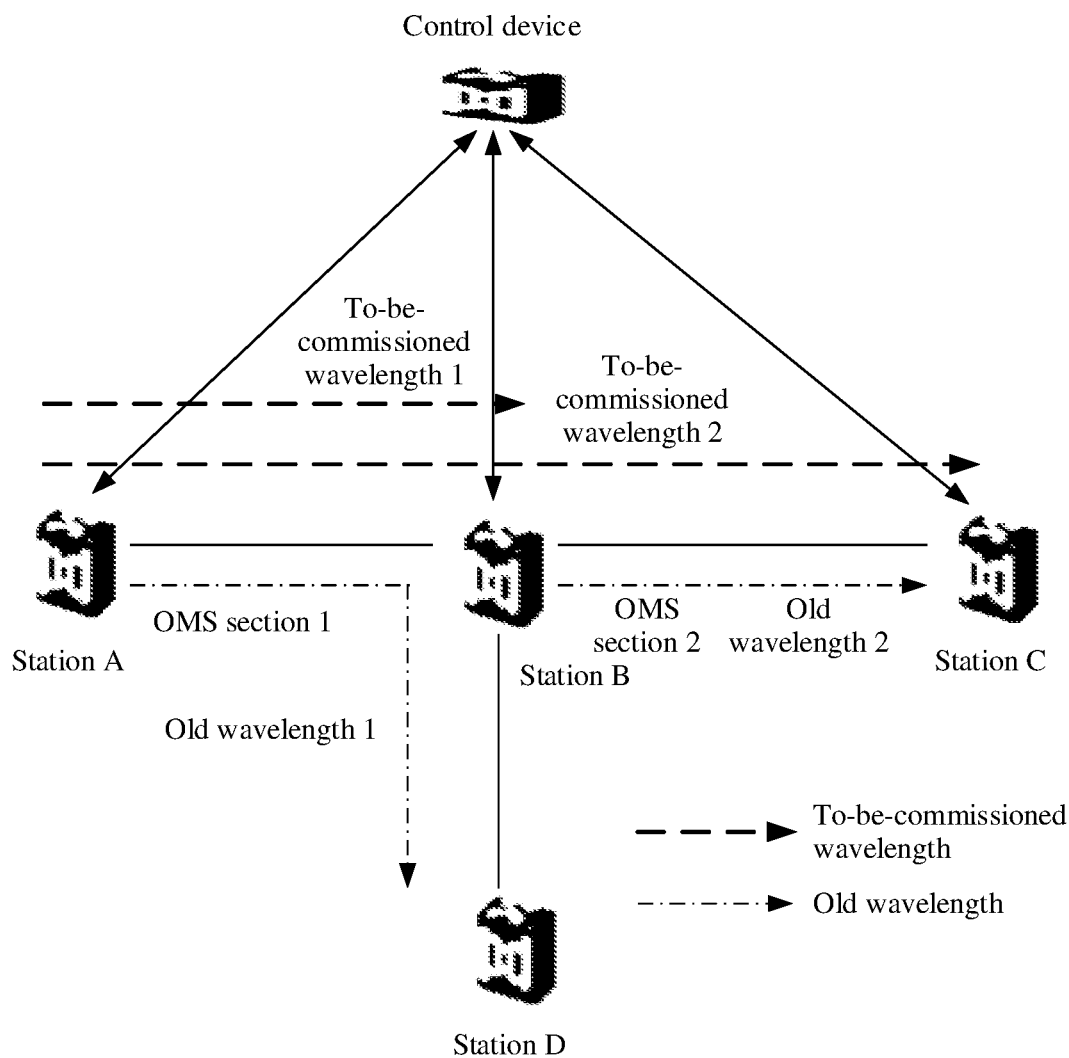
FIG. 6 is a schematic diagram of an optical power commissioning method applicable to embodiments of this application.

FIG. 6 is a schematic diagram applicable to embodiments of this application.

It is assumed that power commissioning needs to be performed on a wavelength service. For example, if service performance is degraded due to optical fiber cutover, optical fiber degradation, intra-station insertion loss degradation, and an improper manual operation, power commissioning needs to be performed on the wavelength service. The following describes a possible procedure of optical power commissioning with reference to FIG. 6.

As shown in FIG. 6, it is assumed that four stations and one control device are included. The stations are denoted as a station A, a station B, a station C, and a station D for distinguishing. The control device may be deployed in a standalone server, or may be deployed in a network element device (for example, any one of the station A, the station B, the station C, and the station D) with a strong capability. A first apparatus (for example, a NETWORK_OD apparatus) is deployed in the control device, and is enabled, so that the first apparatus can perform an automatic optimization commissioning service.

It is assumed that there are four services in the network: an old wavelength 1 (namely, an old-wavelength service 1): the station A→the station B→the station D, an old wavelength 2 (namely, an old-wavelength service 2): the station B→the station C, an old wavelength 3 (namely, an old-wavelength service 3): the station A→the station B, and an old wavelength 4 (namely, an old-wavelength service 4): the station A→the station B→the station C. The old wavelength 1 and the old wavelength 2 are affected wavelengths (namely, affected services). For distinguishing, the old wavelength 1 is denoted as an affected wavelength 1, and the old wavelength 2 is denoted as an affected wavelength 2. The old wavelength 3 and the old wavelength 4 are to-be-commissioned wavelengths (namely, to-be-commissioned services). For distinguishing, the old wavelength 3 is denoted as a to-be-commissioned wavelength 3, and the old wavelength 4 is denoted as a to-be-commissioned wavelength 4. It should be understood that FIG. 6 is merely an example for description, and there may be more wavelength services or more stations in practice.

The following describes a possible complete procedure.

Step 1: A control device automatically monitors network-wide optical performance data in real time. The device collects millisecond service optical performance data in real time per station.

In a possible implementation, a network element device may report single-station board optical performance data to the control device by using an extended path computation element communication protocol. It may be understood that the control device may interact with each network element device by using a field (for example, an extended field) in a PCEP message.

For example, the optical performance data may include but is not limited to input/output multiplexed-wavelength optical power of an optical amplifier board, single-wavelength optical power, an optical amplifier gain, an EVOA loss value, and a service BER.

Taking FIG. 6 as an example, in step 1, all stations such as the station A, the station B, the station C, and the station D collect millisecond service optical performance data, and report the collected service optical performance data to the control device.

For reporting the service optical performance data by the station, refer to the descriptions of step 401 in the method 400. Details are not described herein again.

Step 2: The control device identifies a to-be-commissioned service on which optical power commissioning needs to be performed.

In step 2, the control device may automatically identify network-wide batch performance-degraded services based on the service optical performance data obtained in step 1.

In a possible implementation, the control device identifies, based on at least one of the following, a to-be-commissioned service on which optical power commissioning needs to be performed: whether multiplexed-wavelength output power of each OMS section of a service deviates from a target value, whether an OSNR loss of each service in the OMS is flat, a BER identified for a single-wavelength service, whether optical power of an OTU receive end is abnormal, and whether optical power of a transmit end is abnormal.

For identifying, by the control device based on the service optical performance data, the to-be-commissioned service on which optical power commissioning needs to be performed, refer to the descriptions in the method 400. Details are not described herein again.

Step 3: The control device calculates target optical power of the to-be-commissioned service.

The target optical power is nominal optical power or expected optical power, or is optical power expected after the to-be-commissioned service is commissioned. The control device calculates the target optical power of the to-be-commissioned service. When each OMS section reaches target power, or optical power of each OMS section is adjusted to target optical power, it indicates that the commissioning is completed.

For example, target primary-optical-path optical power may be calculated for a primary optical path on the OMS section based on a rule that an optical amplifier gain is used to compensate for a line loss. It may be understood that the target primary-optical-path optical power is calculated for a primary optical path on each OMS section based on the rule that an optical amplifier gain is used to compensate for a line loss.

For another example, target single-wavelength optical power is an OMS transmit-end single-wavelength optical power in a case of OSNR loss equalization that is calculated based on a currently monitored value. It may be understood that for a single service, the OMS transmit-end single-wavelength optical power in the case of OSNR loss equalization is calculated based on the currently monitored value and used as the target optical power.

Taking FIG. 6 as an example, the to-be-commissioned wavelength 1 (namely, the to-be-commissioned service 1) and the to-be-commissioned wavelength 2 (namely, the to-be-commissioned service 2) pass through an OMS section 1 and an OMS section 2. Target primary-optical-path optical power is calculated for a primary optical path on each OMS section based on a rule that an optical amplifier gain is used to compensate for a line loss, and for a single service, OMS transmit-end single-wavelength optical power in a case of OSNR loss equalization is calculated based on a currently monitored value and used as target optical power.

After determining the target optical power, the control device may calculate commissioning locations and a corresponding total commissioning amount.

Step 4: The control device analyzes and calculates the commissioning locations and the total commissioning amount by using an optimization policy.

For example, an absolute total adjustment amount of the OMS section is calculated.

Taking FIG. 6 as an example, the to-be-commissioned wavelength 1 (namely, the to-be-commissioned service 1) and the to-be-commissioned wavelength 2 (namely, the to-be-commissioned service 2) pass through the OMS section 1 and the OMS section 2. An absolute total adjustment amount of each OMS section is independently calculated.

For example, an absolute total primary-optical-path adjustment amount of the OMS section may be a difference between an optical amplifier gain and a multiplexed-wavelength loss. That is, the difference between the optical amplifier gain and the optical-path loss value of a primary optical path on the OMS section is calculated, and the difference is the absolute total optical-path adjustment amount.

For another example, an absolute total single-wavelength adjustment amount of the OMS section may be a value obtained by subtracting actual single-wavelength optical power from target single-wavelength optical power. That is, the value obtained by subtracting the actual single-wavelength optical power from the target single-wavelength optical power on the OMS section is calculated, and the value is the absolute total single-wavelength adjustment amount.

For another example, a relative total adjustment amount of the OMS section is calculated.

For example, a relative adjustment amount of a commissioning station may be an absolute total adjustment amount of the commissioning station minus a cumulative adjustment amount of all upstream commissioning stations of the commissioning station.

Figure 7:
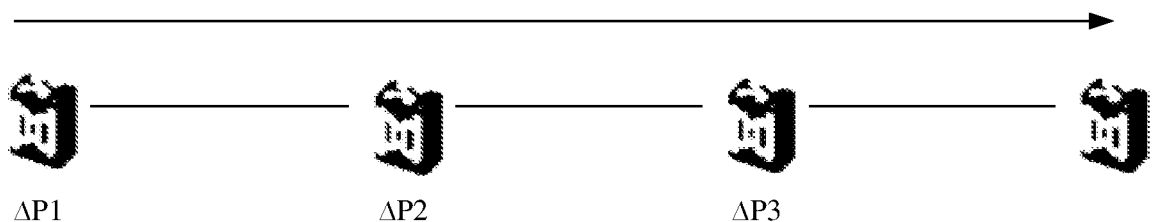
FIG. 7 is a schematic diagram of a relative adjustment amount of an OMS section applicable to embodiments of this application.

Descriptions are provided with reference to FIG. 7.

Relative total adjustment amount $\Delta P1$ of a commissioning station A=Absolute total adjustment amount of the commissioning station A−Total cumulative amount of all adjustment nodes before the commissioning station A=Total absolute adjustment amount of the commissioning station A Relative total adjustment amount $\Delta P2$ of a commissioning station B=Absolute total adjustment amount of the commissioning station B−Total cumulative amount of all adjustment nodes before the commissioning station B=Total absolute adjustment amount of the commissioning station B−Total adjustment amount of the commissioning station A Relative total adjustment amount $\Delta P3$ of a commissioning station C=Absolute total adjustment amount of the commissioning station C−Total cumulative amount of all adjustment nodes before the commissioning station C=Total absolute adjustment amount of the commissioning station C−Total adjustment amount of the commissioning station A−Total adjustment amount of the commissioning station B Considering that service-upstream optical power changes after being commissioned and service-downstream optical power also changes accordingly, through a hedge of upstream and downstream adjustment amounts, an adjustment amount of a downstream station may be an adjustment amount of optical power of each wavelength of the downstream station minus a cumulative adjustment amount of all preceding OMSs, and no separate cutoff operation needs to be performed.

After determining the total commissioning amount, the control device may analyze the commissioning locations and a commissioning step of each commissioning station.

Step 5: The control device analyzes and calculates the commissioning locations and commissioning steps by using the optimization policy.

The control device may analyze and calculate the commissioning locations, a commissioning step of the to-be-commissioned service, and a commissioning step of an affected service by using the optimization policy based on calculated service target power and an expected effect. The following separately provides descriptions.

1. The commissioning step of the to-be-commissioned service

The control device may calculate an optimal adjustment step of the to-be-commissioned service.

In a possible implementation, with consideration of impact of commissioning on security of another wavelength and a requirement for commissioning performance, commissioning steps of commissioning stations may be delivered in parallel based on OMS sections by considering a single-station step constraint and an inter-station co-directional commissioning step constraint.

Example 1: Single-station (OMS) step constraint (namely, an OMS section dimension). Commissioning steps of a plurality of to-be-commissioned services passing through the OMS section on a same station are offset in positive and negative directions does not exceed a third threshold.

The station A in FIG. 6 is used as an example. Multiplexed-wavelength commissioning steps of the to-be-commissioned wavelength 1 (namely, the to-be-commissioned service 1) and the to-be-commissioned wavelength 2 (namely, the to-be-commissioned service 2) on the station A are offset in positive and negative directions does not exceed the third threshold, and WSS single-wavelength commissioning steps of the to-be-commissioned wavelength 1 (namely, the to-be-commissioned service 1) and the to-be-commissioned wavelength 2 (namely, the to-be-commissioned service 2) on the station A are offset in positive and negative directions does not exceed the third threshold.

Example 2: Inter-station (OCH level) step constraint (namely, an OCH service dimension). A co-directional cumulative step of all network elements through which a same service passes does not exceed a fourth threshold.

Taking FIG. 6 as an example, the to-be-commissioned wavelength 2 (namely, the to-be-commissioned service 2) passes through the station A, the station B, and the station C. It is assumed that commissioning steps of the three stations through which the service passes are 0.6 dB, −1.2 dB, and 0.6 dB, and the fourth threshold is 1.6 dB. In this case, a positive cumulative step value is 1.2 dB (that is, 0.6+0.6=1.2), and a negative cumulative step value is 1.2 dB (that is, 1.2). 1.2 dB is less than 1.6 dB. Therefore, each co-directional cumulative step does not exceed the fourth threshold.

The foregoing is merely a brief description. For details of the commissioning step of the to-be-commissioned service, refer to the descriptions of Aspect 3 in the method 400. Details are not described herein again.

2. The commissioning step of the affected service

The control device may calculate an optimal adjustment step of the affected service.

In this embodiment of this application, to protect performance of the affected old wavelength against degradation (for example, OSNR degradation), a pre-adjustment amount of old-wavelength power may be calculated by comparing old-wavelength degradation amounts before and after commissioning.

A commissioning value of the affected old wavelength cannot be accurately calculated before the to-be-commissioned wavelength is commissioned for the first time. To improve accuracy, after the first time of commissioning of the to-be-commissioned wavelength takes effect, an old-wavelength degradation amount may be calculated, and repeated iterations are performed until the old wavelength is not degraded, so that a corresponding pre-adjustment amount of the old wavelength is relatively accurate.

For example, historical optical-amplifier OSNR loss values of the old-wavelength service on the station A and the station B are recorded. After the first time of parallel service commissioning takes effect, real-time optical-amplifier OSNR loss values of the old-wavelength service may be obtained, a difference between the two may be calculated, and single-wavelength commissioning steps of the affected service on the station A and the station B may be determined.

The foregoing is merely a brief description. For details of the commissioning step of the affected service, refer to the descriptions of Aspect 4 in the method 400. Details are not described herein again.

Step 6: The control device delivers commissioning values (or commissioning information) to the commissioning stations (or NE_OD apparatuses configured in the commissioning stations) in parallel based on the commissioning locations and the commissioning steps.

After calculating optical power adjustment amounts of the to-be-commissioned wavelength 1, the to-be-commissioned wavelength 2, and the affected old wavelengths 1 and 2 on the OMS 1 and the OMS 2, the control device needs to deliver the information to corresponding nodes (namely, the commissioning stations).

For example, a PCEP PCUpd message may be extended, to package commissioning information (or multi-fault information) of current commissioning in one message and send the message to a same destination station. For example, the commissioning information may include but is not limited to at least one of the following information: an optical amplifier gain, an optical amplifier gain adjustment amount, and an adjustment node; an EVOA loss, an optical loss adjustment amount, and an adjustment node; a wavelength channel number, a WSS single-wavelength adjustment amount, and an adjustment node of a to-be-commissioned wavelength; and a wavelength channel number, a WSS single-wavelength adjustment amount, and an adjustment node of an affected wavelength.

Commissioning information of different commissioning stations is different. The commissioning station A and the commissioning station B in FIG. 6 are used as examples.

Example (1). Send a PCEP PCUpd message to the commissioning station A, where commissioning information included in the message may include: an optical amplifier gain, an optical amplifier gain adjustment amount, and an adjustment node; an EVOA loss, an optical loss adjustment amount, and an adjustment node; a wavelength channel number, a WSS single-wavelength adjustment amount, and an adjustment node of the to-be-commissioned wavelength 1; a wavelength channel number, a WSS single-wavelength adjustment amount, and an adjustment node of the to-be-commissioned wavelength 2; and a wavelength channel number, a WSS single-wavelength adjustment amount, and an adjustment node of the affected wavelength 1.

Example (2). Send a PCEP PCUpd message to the commissioning station B, where commissioning information included in the message may include: an optical amplifier gain, an optical amplifier gain adjustment amount, and an adjustment node; an EVOA loss, an optical loss adjustment amount, and an adjustment node; a wavelength channel number, a WSS single-wavelength adjustment amount, and an adjustment node of the to-be-commissioned wavelength 2; a wavelength channel number, a WSS single-wavelength adjustment amount, and an adjustment node of the affected wavelength 1; and a wavelength channel number, a WSS single-wavelength adjustment amount, and an adjustment node of the affected wavelength 2.

The foregoing is merely a brief description. For details of step 6, refer to the descriptions of Aspect 5 in the method 400. Details are not described herein again.

Step 7: The control device receives a commissioning complete response (for example, denoted as a commissioning response) of each OMS section in a current round, and actively queries related optical power information of the to-be-commissioned service and the affected service.

In a possible case, after receiving the commissioning response, the control device actively queries the related optical power information of the to-be-commissioned service and the affected service, and may re-perform step 2 to step 5. An actual power value of the to-be-commissioned service gradually approaches a target value, and finally, a difference between service multiplexed-wavelength or single-wavelength optical power of each OMS section and target optical power falls within a specific value range. In this case, it indicates that the current service optimization commissioning is completed.

In another possible case, after receiving the commissioning response, the control device actively queries the related optical power information of the to-be-commissioned service and the affected service, and a difference between service multiplexed-wavelength or single-wavelength optical power of each OMS section and target optical power falls within a specific value range. In this case, it indicates that the current service optimization commissioning is completed.

For example, when the difference between the service multiplexed-wavelength or single-wavelength optical power of each OMS section and the target optical power is less than or equal to 0.5 dB, it indicates that the current service optimization commissioning is completed. It should be understood that 0.5 dB is merely an example for description, and this is not limited in this embodiment of this application.

Based on the foregoing technical solution, for example, a NETWORK_OD apparatus is deployed on the control device, and a PCEP protocol is extended to automatically monitor the network-wide optical performance data in real time, so that the control device (or the NETWORK_OD apparatus deployed on the control device) automatically identifies the network-wide batch performance-degraded services. In addition, the control device calculates the service target power and the expected effect, analyzes and calculates the commissioning locations and the commissioning steps (of the to-be-commissioned service and the affected service) by using the optimization policy, and controls a plurality of services, a plurality of OMS sections, and a plurality of commissioning stations by using the PCEP protocol for parallel commissioning. In this way, in an optimization commissioning process, parallel commissioning is performed to the greatest extent while security of the old wavelength is ensured, so that optimization commissioning efficiency is improved.

In addition, the control device delivers batch commissioning values of different network elements (namely, different commissioning stations) in parallel at the same time. Considering different communication time between commissioning stations, it cannot be ensured that all the commissioning values take effect at the same time. Therefore, the control device may deliver optimal commissioning steps of the commissioning stations at the same time, and synchronously perform optical power pre-adjustment on affected services. The commissioning stations adjust optical power in parallel to make the optical power gradually approach target power, so that secure and quick optimization is implemented, thereby ensuring parallel commissioning reliability and security.

The foregoing describes a specific example with reference to FIG. 6 and step 1 to step 7. In a centralized control scenario, for example, a NETWORK_OD apparatus is deployed on a control device, and a PCEP protocol is extended to support automatic parallel optimization commissioning. Specifically, the control device delivers a first round of adjustment amounts in parallel, and after commissioning stations return commissioning responses, queries real-time optical power information of a to-be-commissioned service and a related affected service, and re-performs delivery to perform a second round of parallel commissioning, until one optimization commissioning process is completed after a plurality of rounds of commissioning. This parallel optimization commissioning manner has a relatively accurate result.

The following still uses FIG. 6 as an example to describe another specific example with reference to step A to step F. For example, a NETWORK_OD apparatus is deployed on a control device, and a PCEP protocol is extended, so that an automatic parallel optimization commissioning manner in which a plurality of times of small-step delivery commissioning are performed and feedback is performed when a specific condition (for example, after a cumulative commissioning amount reaches a threshold) is met.

Step A: The control device automatically monitors network-wide optical performance data in real time: The device collects millisecond service optical performance data in real time per station.

For this step, refer to the foregoing step 1.

Step B: The control device identifies a to-be-commissioned service on which optical power commissioning needs to be performed.

For this step, refer to the foregoing step 2.

Step C: The control device calculates target optical power of the to-be-commissioned service.

For this step, refer to the foregoing step 3.

Step D: The control device analyzes and calculates commissioning locations and a total commissioning amount by using an optimization policy.

For this step, refer to the foregoing step 4.

Step E: The control device delivers commissioning information (which may also be denoted as a commissioning request) to each commissioning station.

The control device may perform delivery commissioning based on a small step (for example, 0.2 dB). Because the commissioning step is relatively small, and impact of commissioning values of a service in positive and negative directions is offset, an affected service is little affected even if not all commissioning values take effect at the same time because a communication difference between network elements exists. After receiving a commissioning response fed back by each commissioning station, the control device continues to deliver commissioning information (or a commissioning request) at a small step. When a specific condition is met after a plurality of rounds of commissioning, a current round of small-step commissioning ends.

In a possible case, the current round of small-step commissioning ends when a quantity of commissioning times reaches a preset quantity of times.

For example, the current round of small-step commissioning may end when a quantity of commissioning times of any commissioning station reaches a preset quantity of times.

For another example, the current round of small-step commissioning may end when a total quantity of commissioning times of all the commissioning stations reaches a preset quantity of times.

In another possible case, the current round of small-step commissioning ends when a commissioning amount reaches a preset commissioning amount.

For example, the current round of small-step commissioning may end when a commissioning amount of any commissioning station reaches a first threshold.

For another example, the current round of small-step commissioning may end when a total commissioning amount of all the commissioning stations reaches a second threshold.

For details, refer to the descriptions of Solution 2 in the method 400. Details are not described herein again.

Step F: The control device queries optical power information of the to-be-commissioned service and the affected service.

It may be understood that, after a specific condition is met, the control device queries the optical power information of the to-be-commissioned service and the affected service.

In a possible case, after receiving the commissioning response, the control device actively queries the related optical power information of the to-be-commissioned service and the affected service, and may re-perform step B to step E. An actual power value of the to-be-commissioned service gradually approaches a target value, and finally, a difference between service multiplexed-wavelength or single-wavelength optical power of each OMS section and target optical power falls within a specific value range. In this case, it indicates that the current service optimization commissioning is completed.

In another possible case, after receiving the commissioning response, the control device actively queries the related optical power information of the to-be-commissioned service and the affected service, and a difference between service multiplexed-wavelength or single-wavelength optical power of each OMS section and target optical power falls within a specific value range. In this case, it indicates that the current service optimization commissioning is completed.

For example, when the difference between the service multiplexed-wavelength or single-wavelength optical power of each OMS section and the target optical power is less than or equal to 0.5 dB, it indicates that the current service optimization commissioning is completed. It should be understood that 0.5 dB is merely an example for description, and this is not limited in this embodiment of this application.

The foregoing describes another specific example with reference to FIG. 6 and step A to step F. In a centralized control scenario, for example, a NETWORK_OD apparatus is deployed on a control device, and a PCEP protocol is extended, so that an automatic parallel optimization commissioning manner in which a plurality of times of small-step delivery commissioning are performed and feedback is performed when a specific condition (for example, after a cumulative commissioning amount reaches a threshold) is met. Specifically, an automatic parallel optimization commissioning manner in which a plurality of times of small-step delivery commissioning are performed for each commissioning station and feedback is performed when a specific condition (for example, after a specific commissioning amount is reached through accumulation) is met may be considered, to reduce time of a plurality of times of network real-time optical power query. In addition, small-step delivery is performed for each commissioning station, and an adjustment amount delivered at a small step for the second time carries an adjustment amount of an affected service, so that security of the old-wavelength service is ensured. This manner is more suitable for a scenario in which a network topology is relatively large and a span of network elements through which a to-be-commissioned service and an affected service pass is relatively large.

It should be understood that a name of the message in the foregoing embodiment does not limit the protection scope of embodiments of this application. For example, in a future protocol, a name used to indicate a function similar to that of the control device is also applicable to embodiments of this application.

Based on the foregoing technical solution, an automatic parallel optimization commissioning method is provided. A control device commissioning center monitors service optical performance data in real time, automatically identifies, based on analysis of the service optical performance data, a service on which optimization needs to be performed, calculates commissioning target power and an effect, determines a parallel commissioning policy, controls commissioning stations together, and performs parallel commissioning, In this way, a requirement of a customer for quick and automatic optimization commissioning can be met.

In addition, small-step delivery may be performed to implement parallel commissioning. When security is ensured, parallel service commissioning is implemented to the greatest extent, and efficiency is improved. In addition, this may be further extended to a plurality of commissioning scenarios, which, for example, may include but are not limited to deployment commissioning, expansion commissioning, rerouting commissioning, and the like.

Further, the parallel commissioning solution provided in this application can improve commissioning efficiency and ensure commissioning security.

Commissioning efficiency can be improved. Commissioning stations perform parallel commissioning, and no separate cutoff operation needs to be performed considering that upstream and downstream adjustment amounts hedge against each other. Steps of a primary optical path and a single wavelength are independently calculated and decoupled from each other, so that repeated calculation of a multiplexed-wavelength power adjustment amount can be avoided, and a quantity of commissioning times can be reduced.

In addition, commissioning security can be further ensured. For example, in small-step commissioning, both a single-OMS step constraint and an OCH-level co-directional commissioning step constraint are considered. Considering asynchronous communication of network elements, a co-directional step constraint is limited, so that assurance can be provided for a case in which commissioning values in a same direction take effect. For another example, a plurality of times of small-step delivery commissioning are performed and feedback is performed when a specific condition (for example, after a specific commissioning amount is reached through accumulation) is met, so that a considerable performance fluctuation caused by an excessively large adjustment amount delivered once is avoided. In addition, hedge assurance is provided, that is, parallel commissioning implements a small-step hedge of upstream and downstream power to avoid a fluctuation.

Embodiments described in this specification may be independent solutions, or may be combined according to internal logic. These solutions fall within the protection scope of this application.

It may be understood that methods and operations implemented by the control device in the foregoing method embodiments may be alternatively implemented by components (for example, a chip or a circuit) that may be used in the control device, and methods and operations implemented by the commissioning station (or the network element) in the foregoing method embodiments may be alternatively implemented by components (for example, a chip or a circuit) that may be used in the commissioning station.

With reference to FIG. 4 to FIG. 7, the foregoing describes in detail the method provided in embodiment of this application. With reference to FIG. 8 to FIG. 12, the following describes in detail an apparatus provided in embodiments of this application. It should be understood that descriptions of the apparatus embodiments correspond to the descriptions of the method embodiments, and therefore, for content that is not described in detail, refer to the foregoing method embodiments. For simplicity, details are not described herein again.

It may be understood that, to implement the foregoing functions, each device such as a control device or a commissioning station includes a corresponding hardware structure and/or software module for performing each function. A person skilled in the art should be aware that with reference to units, algorithms, and steps in the examples described the embodiments disclosed in this specification, this application can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, the control device and the commissioning station may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation. The following uses, for description, an example in which functional modules are obtained through division based on corresponding functions.

Figure 8:
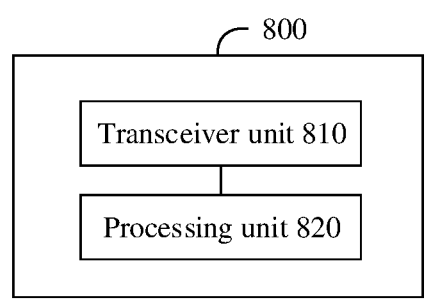
FIG. 8 is a schematic diagram of an optical power commissioning apparatus according to an embodiment of this application.

FIG. 8 is a schematic block diagram of an optical power commissioning apparatus according to an embodiment of this application. The apparatus 800 includes a transceiver unit 810 and a processing unit 820. The transceiver unit 810 may implement a corresponding communication function, and the processing unit 820 is configured to perform data processing. The transceiver unit 810 may also be referred to as a communication interface or a communication unit.

Optionally, the apparatus 800 may further include a storage unit, the storage unit may be configured to store instructions and/or data, and the processing unit 820 may read the instructions and/or the data in the storage unit, so that the apparatus implements the foregoing method embodiments.

The apparatus 800 may be configured to perform actions performed by a commissioning system (for example, including a control device and a commissioning station) in the foregoing method embodiments. In this case, the apparatus 800 may be the commissioning system or a component that may be configured in the commissioning system. The transceiver unit 810 is configured to perform receiving/transmission related operations on a commissioning system side in the foregoing method embodiments, and the processing unit 820 is configured to perform processing related operations on the commissioning system side in the foregoing method embodiments.

Alternatively, the apparatus 800 may be configured to perform actions performed by the control device in the foregoing method embodiments. In this case, the apparatus 800 may be the control device or a component that may be configured in the control device. The transceiver unit 810 is configured to perform receiving/transmission related operations on a control device side in the foregoing method embodiments, and the processing unit 820 is configured to perform processing related operations on the control device side in the foregoing method embodiments.

Alternatively, the apparatus 800 may be configured to perform actions performed by the commissioning station in the foregoing method embodiments. In this case, the apparatus 800 may be the commissioning station or a component that may be configured in the commissioning station. The transceiver unit 810 is configured to perform receiving/transmission related operations on a commissioning station side in the foregoing method embodiments, and the processing unit 820 is configured to perform processing related operations on the commissioning station side in the foregoing method embodiments.

In a design, the apparatus 800 is configured to perform actions performed by a commissioning system in the foregoing embodiment shown in FIG. 4. The commissioning system may include a control device and N commissioning stations. N is an integer greater than or equal to 1. The processing unit 820 is configured to determine M to-be-commissioned services on which optical power commissioning needs to be performed. M is an integer greater than or equal to 1. The transceiver unit 810 is further configured to send commissioning information to the N commissioning stations based on the M to-be-commissioned services. The commissioning information is used by the N commissioning stations to perform parallel optical power commissioning, and the N commissioning stations are stations on which the M to-be-commissioned services are located. The processing unit 820 is further configured to perform optical power commissioning based on the commissioning information.

For example, the transceiver unit 810 is further configured to receive service optical performance data reported by W stations. W is an integer greater than or equal to 1. The processing unit 820 is configured to determine the M to-be-commissioned services based on the reported service optical performance data.

For another example, the transceiver unit 810 is configured to send commissioning information to the N commissioning stations T times, so that the N commissioning stations perform parallel optical power commissioning based on commissioning information received each time. T is an integer greater than or equal to 1. The transceiver unit 810 is specifically configured to feed back commissioning responses to the control device after each time of optical power commissioning performed by the N commissioning stations, and the processing unit 820 is further configured to query real-time optical power information of the M to-be-commissioned services and an affected service based on the commissioning responses; or the transceiver unit 810 is configured to feed back commissioning responses to the control device after the N commissioning stations perform a $T1^{th}$ time of optical power commissioning, and the processing unit 820 is further configured to query real-time optical power information of the M to-be-commissioned services and an affected service based on the commissioning responses, where T1 is an integer greater than 1 and less than or equal to T; or the transceiver unit 810 is configured to feed back a commissioning response to the control device after a cumulative adjustment amount of any one of the N commissioning stations reaches a first threshold, and the processing unit 820 is further configured to query real-time optical power information of the M to-be-commissioned services and an affected service based on the commissioning response; or the transceiver unit 810 is configured to feed back commissioning responses to the control device after a total cumulative adjustment amount of the N commissioning stations reaches a second threshold, and the processing unit 820 is further configured to query real-time optical power information of the M to-be-commissioned services and an affected service based on the commissioning responses.

For another example, the M to-be-commissioned services correspond to X optical multiplex sections OMSs. X is an integer greater than or equal to 1. The processing unit 820 is further configured to calculate at least one of the following of each of the X OMSs: an absolute total multiplexed-wavelength adjustment amount, an absolute total single-wavelength adjustment amount, and a relative adjustment amount of each commissioning station.

For another example, the processing unit 820 is further configured to calculate at least one of the following information of each of the N commissioning stations: a multiplexed-wavelength optical power adjustment amount and a single-wavelength optical power adjustment amount.

For another example, the multiplexed-wavelength optical power adjustment amount and/or the single-wavelength optical power adjustment amount meet or meets at least one of the following: optical power adjustment amounts, on a same commissioning station, of to-be-commissioned services passing through a same OMS section in the M to-be-commissioned services are offset in positive and negative directions is less than or equal to a third threshold, and a co-directional cumulative optical power adjustment amount of N1 commissioning stations is less than or equal to a fourth threshold. The N1 commissioning stations are commissioning stations on which a same to-be-commissioned service is located, the N1 commissioning stations belong to the N commissioning stations, and N1 is an integer greater than or equal to 1.

For another example, the processing unit 820 is further configured by the control device to calculate an optical power adjustment amount of the affected service based on degradation amounts of the affected service before and after the N commissioning stations perform commissioning. The affected service represents a service affected by commissioning of the N commissioning stations.

For another example, the commissioning information includes at least one of the following: an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, and an optical power adjustment amount of the affected wavelength.

In another design, the apparatus 800 is configured to perform actions performed by the control device in the foregoing embodiment shown in FIG. 4. The processing unit 820 is configured to determine M to-be-commissioned services on which optical power commissioning needs to be performed. M is an integer greater than or equal to 1. The transceiver unit 810 is configured to send commissioning information to N commissioning stations based on the M to-be-commissioned services. The commissioning information is used by the N commissioning stations to perform parallel optical power commissioning. The N commissioning stations are stations on which the M to-be-commissioned services are located, and N is an integer greater than or equal to 1.

For example, the transceiver unit 810 is further configured to receive service optical performance data reported by W stations. W is an integer greater than or equal to 1. The processing unit 820 is configured to determine the M to-be-commissioned services based on the service optical performance data reported by the W stations.

For another example, the transceiver unit 810 is configured to send commissioning information to the N commissioning stations T times, so that the N commissioning stations perform parallel optical power commissioning based on commissioning information received each time. T is an integer greater than or equal to 1. After each time of optical power commissioning performed by the N commissioning stations, the transceiver unit 810 is further configured to receive a commissioning response fed back by each commissioning station, and the processing unit 820 is further configured to query real-time optical power information of the M to-be-commissioned services and an affected service; or after the N commissioning stations perform a $T1^{th}$ time of optical power commissioning, the transceiver unit 810 is further configured to receive a commissioning response fed back by each commissioning station, and the processing unit 820 is further configured to query real-time optical power information of the M to-be-commissioned services and an affected service, where T1 is an integer greater than 1 and less than or equal to T; or after a cumulative adjustment amount of any one of the N commissioning stations reaches a first threshold, the transceiver unit 810 is further configured to receive a commissioning response fed back by each commissioning station, and the processing unit 820 is further configured to query real-time optical power information of the M to-be-commissioned services and an affected service; or after a total cumulative adjustment amount of the N commissioning stations reaches a second threshold, the transceiver unit 810 is further configured to receive a commissioning response fed back by each commissioning station, and the processing unit 820 is further configured to query real-time optical power information of the M to-be-commissioned services and an affected service.

For another example, the M to-be-commissioned services correspond to X optical multiplex sections OMSs. X is an integer greater than or equal to 1. The processing unit 820 is further configured to calculate at least one of the following of each of the X OMSs: an absolute total multiplexed-wavelength adjustment amount, an absolute total single-wavelength adjustment amount, and a relative adjustment amount of each commissioning station.

For another example, the processing unit 820 is further configured to calculate at least one of the following information of each of the N commissioning stations: a multiplexed-wavelength optical power adjustment amount and a single-wavelength optical power adjustment amount.

For another example, the multiplexed-wavelength optical power adjustment amount and/or the single-wavelength optical power adjustment amount meet or meets at least one of the following: optical power adjustment amounts, on a same commissioning station, of to-be-commissioned services passing through a same OMS section in the M to-be-commissioned services are offset in positive and negative directions is less than or equal to a third threshold, and a co-directional cumulative optical power adjustment amount of N1 commissioning stations is less than or equal to a fourth threshold. The N1 commissioning stations are commissioning stations on which a same to-be-commissioned service is located, the N1 commissioning stations belong to the N commissioning stations, and N1 is an integer greater than or equal to 1.

For another example, the processing unit 820 is further configured to calculate an optical power adjustment amount of the affected service based on degradation amounts of the affected service before and after the N commissioning stations perform commissioning. The affected service represents a service affected by commissioning of the N commissioning stations.

For another example, the commissioning information includes at least one of the following: an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, and an optical power adjustment amount of the affected wavelength.

In still another design, the apparatus 800 is configured to perform actions performed by the commissioning station in the foregoing embodiment shown in FIG. 4. The transceiver unit 810 is configured to report service optical performance data to a control device. The transceiver unit 810 is further configured to receive commissioning information from the control device. The commissioning information is used by N commissioning stations to perform parallel optical power commissioning, the N commissioning stations include the commissioning station, and N is an integer greater than or equal to 1. The processing unit 820 is configured to perform optical power commissioning based on the commissioning information.

For example, the transceiver unit 810 is configured to receive commissioning information from the control device T times. T is an integer greater than or equal to 1. After each time of optical power commissioning performed by the commissioning station, the transceiver unit 810 is further configured to feed back a commissioning response to the control device; or after the commissioning station performs a T1$^{th}$ time of optical power commissioning, the transceiver unit 810 is further configured to feed back a commissioning response to the control device, where T1 is an integer greater than 1 and less than or equal to T; or after a cumulative adjustment amount of the commissioning station reaches a first threshold, the transceiver unit 810 is further configured to feed back a commissioning response to the control device.

For another example, the commissioning information includes at least one of the following: an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, and an optical power adjustment amount of the affected wavelength.

The processing unit 820 in the foregoing embodiment may be implemented by at least one processor or processor related circuit. The transceiver unit 810 may be implemented by a transceiver or a transceiver related circuit. The storage unit may be implemented by at least one memory.

Figure 9:
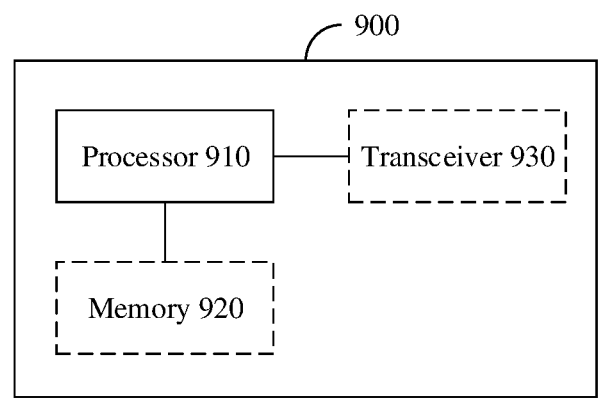
FIG. 9 is a schematic diagram of another optical power commissioning apparatus according to an embodiment of this application.

As shown in FIG. 9, an embodiment of this application further provides an optical power commissioning apparatus 900. The apparatus 900 includes a processor 910. The processor 910 is coupled to a memory 920, the memory 920 is configured to store a computer program or instructions and/or data, and the processor 910 is configured to execute the computer program or the instructions and/or the data stored in the memory 920, so that the methods in the foregoing method embodiments are performed.

Optionally, the apparatus 900 includes one or more processors 910.

Optionally, as shown in FIG. 9, the apparatus 900 may further include a memory 920.

Optionally, the apparatus 900 may include one or more memories 920.

Optionally, the memory 920 and the processor 910 may be integrated together or separately disposed.

Optionally, as shown in FIG. 9, the apparatus 900 may further include a transceiver 930, and the transceiver 930 is configured to receive and/or send a signal. For example, the processor 910 is configured to control the transceiver 930 to receive and/or send a signal.

In a solution, the apparatus 900 is configured to implement operations performed by the control device in the foregoing method embodiments.

For example, the processor 910 is configured to implement processing related operations performed by the control device in the foregoing method embodiments, and the transceiver 930 is configured to implement receiving/transmission related operations performed by the control device in the foregoing method embodiments.

In another solution, the apparatus 900 is configured to implement operations performed by the commissioning station in the foregoing method embodiments.

For example, the processor 910 is configured to implement processing related operations performed by the commissioning station in the foregoing method embodiments, and the transceiver 930 is configured to implement receiving/transmission related operations performed by the commissioning station in the foregoing method embodiments.

Figure 10:
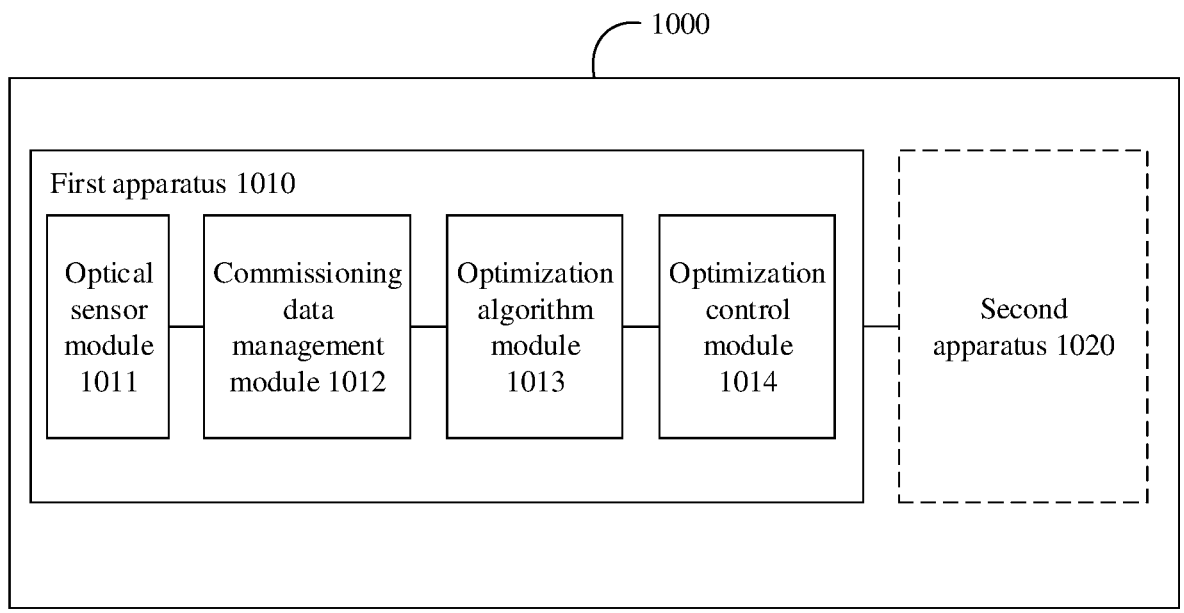
FIG. 10 is a schematic diagram of a control device according to an embodiment of this application.

As shown in FIG. 10, an embodiment of this application further provides a control device 1000. The control device 1000 is configured to implement operations performed by the control device in the foregoing method embodiments.

The control device 1000 includes a first apparatus 1010. For example, the first apparatus 1010 may be denoted as a NETWORK_OD apparatus.

Optionally, for example, the first apparatus 1010 may include four modules: an optical sensor module 1011, a commissioning data management module 1012, an optimization algorithm module 1013, and an optimization control module 1014.

For example, the optical sensor module 1011 may collect and monitor an OMS (or OCH) optical performance parameter, and upload the optical performance parameter to the commissioning data management module. For example, the optical sensor module 1011 may be configured to implement step 401, step 1, and step A.

For example, the commissioning data management module 1012 may implement data concatenation (for example, depending on a network topology relationship), data lifecycle management (on real-time data or historical data), or data cleaning or preprocessing.

For example, the optimization algorithm module 1013 may model the optical-performance physical parameter to calculate some commissioning information such as target optical power of a to-be-commissioned service, an optimal adjustment step of the to-be-commissioned service, and an adjustment amount of each old wavelength in affected services, and provide the commissioning information for the optimization control module for parallel commissioning. For example, the optimization algorithm module 1013 may be configured to implement step 420, step 3 to step 7, and step C to step F.

For example, the optimization control module 1014 may automatically identify batch performance-degraded services, and control a plurality of rounds of multi-service and multi-fault parallel commissioning for network elements. For example, the optimization control module 1014 may be configured to implement step 401, step 420, step 2, step 6, step B, and step E.

Optionally, the optical sensor module 1011, the commissioning data management module 1012, the optimization algorithm module 1013, and the optimization control module 1014 may be implemented by using software, may be implemented by using hardware, or may be implemented by using hardware and software. In addition, the optical sensor module 1011, the commissioning data management module 1012, the optimization algorithm module 1013, and the optimization control module 1014 may be different chips, or may be integrated into one chip or integrated circuit.

Optionally, in the foregoing embodiment, the optical sensor module 1011, the commissioning data management module 1012, the optimization algorithm module 1013, and the optimization control module 1014 may be implemented by using processors or processor related circuits.

It should be understood that the optical sensor module 1011, the commissioning data management module 1012, the optimization algorithm module 1013, and the optimization control module 1014 are obtained through division based on different functions. However, this should not constitute any limitation on this application.

Optionally, the control device 1000 may further include a second apparatus 1020. For example, the second apparatus 1020 may be denoted as a PCEP control apparatus.

For example, the second apparatus 1020 may be configured to control reporting of a real-time optical performance resource of a network and delivery of an adjustment amount. The second apparatus can ensure that the real-time optical performance resource is automatically sent to the NETWORK_OD apparatus (namely, the first apparatus 1010).

Optionally, the first apparatus 1010 and the second apparatus 1020 may be implemented by using software, may be implemented by using hardware, or may be implemented by using hardware and software. In addition, the first apparatus 1010 and the second apparatus 1020 may be different chips, or may be integrated into one chip or integrated circuit.

Optionally, in the foregoing embodiment, both the first apparatus 1010 and the second apparatus 1020 may be implemented by using processors or processor related circuits.

Figure 11:
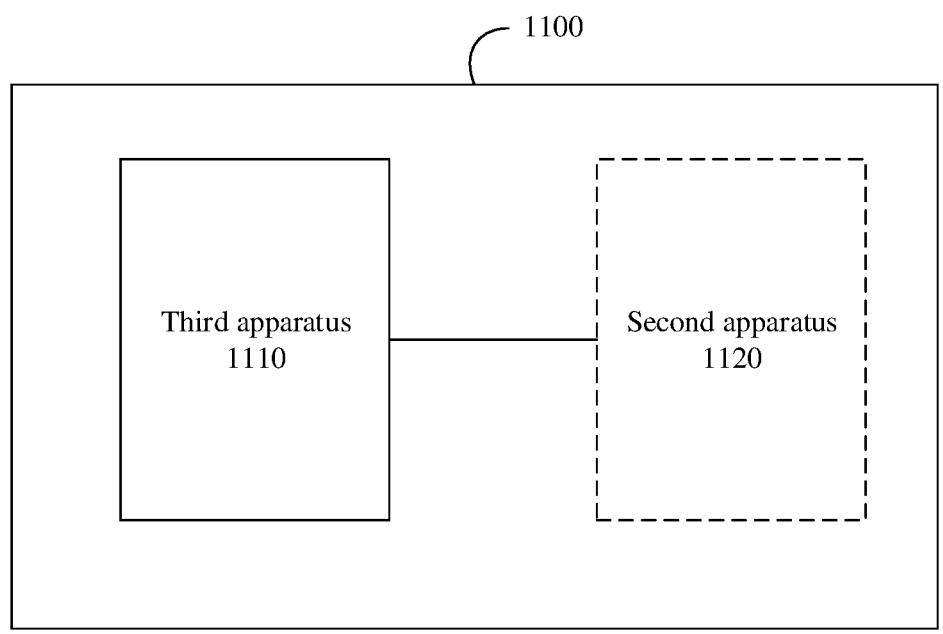
FIG. 11 is a schematic diagram of a commissioning station according to an embodiment of this application.

As shown in FIG. 11, an embodiment of this application further provides a commissioning station 1100. The commissioning station 1100 is configured to implement operations performed by the commissioning station in the foregoing method embodiments.

The commissioning station 1100 includes a third apparatus 1110. For example, the third apparatus 1110 may be denoted as an NE_OD apparatus.

For example, the third apparatus 1110 may be used for network element commissioning performance data management and network element commissioning control. Network element commissioning performance data management is millisecond optical performance data collection of a device board and management of optical performance data of an optical component in a network element service. Network element commissioning control is executing and responding to a network element commissioning action. The third apparatus can collect millisecond optical performance data in real time, and provide network real-time data for an automated system. For example, the third apparatus 1110 may be configured to implement step 401, step 1, and step A.

Optionally, the commissioning station 1100 may further include a second apparatus 1120. For example, the second apparatus 1120 may be configured to control reporting of a real-time optical performance resource of a network and delivery of an adjustment amount. The second apparatus can ensure that the real-time optical performance resource is automatically sent to the NETWORK_OD apparatus (namely, the third apparatus).

Optionally, the third apparatus 1110 and the second apparatus 1120 may be implemented by using software, may be implemented by using hardware, or may be implemented by using hardware and software. In addition, the third apparatus 1110 and the second apparatus 1120 may be different chips, or may be integrated into one chip or integrated circuit.

Optionally, in the foregoing embodiment, both the third apparatus 1110 and the second apparatus 1120 may be implemented by using processors or processor related circuits.

An embodiment of this application further provides an optical power commissioning device 1200.

In a design, the device 1200 may be a control device or a chip. In this design, the device 1200 may be configured to perform operations performed by the control device in the foregoing method embodiments.

In another design, the device 1200 may be a commissioning station (for example, a network element) or a chip. In this design, the device 1200 may be configured to perform operations performed by the commissioning station in the foregoing method embodiments.

Figure 12:
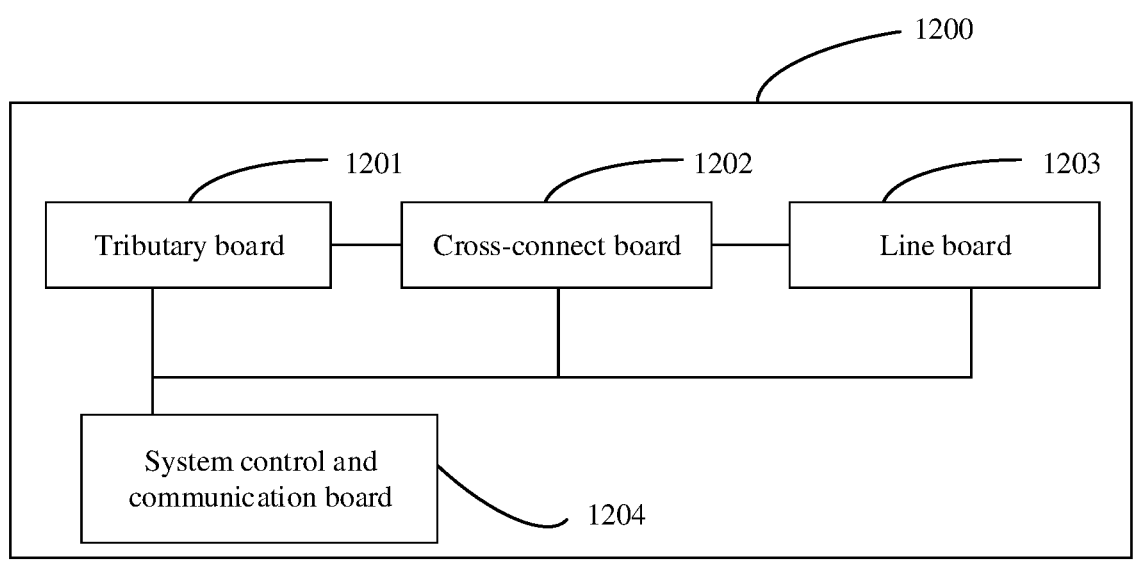
FIG. 12 is a schematic diagram of an optical power commissioning device according to an embodiment of this application.

As shown in FIG. 12, the device 1200 may include a tributary board 1201, a cross-connect board 1202, a line board 1203, an optical layer processing board (not shown in the figure), and a system control and communication board 1204. The device may include different types of boards of different quantities based on a specific requirement. For example, a device serving as a core node may include no tributary board 1201. For another example, a device serving as an edge node may include a plurality of tributary boards 1201, or include no optical cross-connect board 1202. For still another example, a device supporting only an electrical layer function may include no optical layer processing board.

The tributary board 1201, the cross-connect board 1202, and the line board 1203 may be configured to process an electrical layer signal of an optical transport network (OTN). The tributary board 1201 is configured to receive and send various customer services such as a packet service, an Ethernet service, and a forward service. Still further, the tributary board 1201 may be divided into an optical module on a client side and a signal processor. The optical module on the client side may be an optical transceiver, configured to receive and/or send service data. The signal processor is configured to map service data to a data frame and demap the service data from the data frame. The cross-connect board 1202 may be configured to exchange data frames, to complete exchanging one or more types of data frames. The line board 1203 may be configured to process a data frame on a line side. For example, the line board 1203 may be divided into an optical module on the line side and a signal processor. The optical module on the line side may be an optical transceiver on the line side, configured to receive and/or send a data frame. The signal processor is configured to multiplex and demultiplex a data frame on the line side, or map and demap a data frame on the line side. The system control and communication board 1204 is configured to implement system control. Specifically, the system control and communication board 1204 may collect information from different boards by using a backplane or send a control instruction to a corresponding board. It should be noted that, unless otherwise specified, there may be one or more specific components (for example, signal processors). This is not limited in this application. It should be further noted that a type of a board included in the device, a function design of the board, and a quantity of boards are not limited in this application. It should be noted that during specific implementation, two boards mentioned above may be designed as one board. In addition, the device may further include a standby power supply, a heat dissipation fan, and the like.

For example, when the device 1200 is a control device, in an implementation, the line board 1203 may be configured to perform processing actions on a control device side in FIG. 4 to FIG. 7. The communication board 1204 may be configured to perform receiving/transmission operations on the control device side in FIG. 4 to FIG. 7.

For another example, when the device 1200 is a commissioning station, in an implementation, the line board 1203 may be configured to perform processing actions on a commissioning station side in FIG. 4 to FIG. 7. The communication board 1204 may be configured to perform receiving/transmission operations on the commissioning station side in FIG. 4 to FIG. 7.

It should be understood that FIG. 12 is merely an example instead of a limitation. The foregoing control device or commissioning station including a transceiver unit and a processing unit may not depend on the structure shown in FIG. 12.

When the device 1200 is a chip, the chip includes a transceiver unit and a processing unit. The transceiver unit may be an input/output circuit or a communication interface. The processing unit may be a processor, a microprocessor, or an integrated circuit integrated on the chip.

An embodiment of this application further provides a computer-readable storage medium. The computer-readable storage medium stores computer instructions used to implement the method performed by the control device or the method performed by the commissioning station in the foregoing method embodiments.

For example, when the computer instructions are executed by a computer, the computer can implement the method performed by the control device or the method performed by the commissioning station in the foregoing method embodiments.

An embodiment of this application further provides a computer program product including instructions. When the instructions are executed by a computer, the computer implements the method performed by the control device or the method performed by the commissioning station in the foregoing method embodiments.

An embodiment of this application further provides a commissioning system. The system includes the control device and the commissioning station in the foregoing embodiments.

It may be clearly understood by a person skilled in the art that, for convenience and brevity of description, for explanation and beneficial effects of related content in any apparatus provided above, refer to the foregoing corresponding method embodiments, and details are not described herein again.

In embodiments of this application, the control device or the commissioning station may include a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system on the operating system layer may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software.

Embodiments of this application set no particular limitation on a specific structure of an execution body of the method provided in embodiments of this application, provided that a program that records code of the method provided in embodiments of this application can be run to perform communication according to the method provided in embodiments of this application. For example, the method provided in embodiments of this application may be performed by a control device or a commissioning station, or may be a functional module that can invoke a program and execute the program in the control device or the commissioning station.

Aspects or features of this application may be implemented as a method, an apparatus, or a product that uses standard programming and/or engineering technologies. The term "product" used in this application may cover a computer program that can be accessed from any computer-readable component, carrier, or medium.

The computer-readable storage medium may be any usable medium accessible by a computer, or a data storage device, such as a server or a data center, integrating one or more usable media. For example, the usable media (or computer readable media) may include but is not limited to a magnetic medium or a magnetic storage component (for example, a floppy disk, a hard disk (for example, a removable hard disk), or a magnetic tape), an optical medium (for example, an optical disc, a compact disc (CD), or a digital versatile disk (DVD)), a smart card, a flash memory component (for example, an erasable programmable read-only memory (EPROM), a card, a stick, or a key drive), a semiconductor medium (for example, a solid-state drive (SSD)), a USB flash drive, a read-only memory (ROM), or a random access memory (RAM) that may store program code.

Various storage media described in this specification may indicate one or more devices and/or other machine-readable media that are configured to store information. The term "machine-readable media" may include but is not limited to a wireless channel, and various other media that can store, include, and/or carry instructions and/or data.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (Electrically EPROM, EEPROM), or a flash memory. The volatile memory may be a random access memory (RAM). For example, the RAM may be used as an external cache. By way of example and not limitation, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, discrete gate or transistor logic device, or discrete hardware component, the memory (a storage module) may be integrated into the processor.

It should be further noted that the memory described in this specification is to include but is not limited to these memories and a memory of any other proper type.

In the several embodiments provided in this application, it should be understood that the disclosed apparatuses and methods may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing units described as separate parts may or may not be physically separate, and parts displayed as units may or may not be physical units, may be located in one position, or may be distributed on a plurality of network units. Some or all of the units may be selected based on an actual requirement to implement the solutions provided in this application.

In addition, functional units in embodiments of this application may be integrated into one processing unit, each of the units may exist alone physically, or two or more units may be integrated into one unit.

All or some of the foregoing embodiments may be implemented by using software, hardware, firmware, or any combination thereof.

When software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are completely or partially generated. The computer may be a general-purpose computer, a dedicated computer, a computer network, or another programmable apparatus. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing descriptions.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. An optical power commissioning method, comprising:
    determining, by a control device, M to-be-commissioned services on which optical power commissioning needs to be performed, wherein M is an integer greater than or equal to 1; and
    sending, by the control device, commissioning information to N commissioning stations based on the M to-be-commissioned services, wherein the N commissioning stations perform parallel optical power commissioning based on the commissioning information;
    calculating, by the control device, before sending commissioning information to the N commissioning stations, at least one of an absolute total single-wavelength adjustment amount or a relative adjustment amount of each commissioning station;
    wherein the N commissioning stations are stations on which the M to-be-commissioned services are located, and wherein N is an integer greater than or equal to 1;
    wherein the sending, by the control device, commissioning information to the N commissioning stations comprises:
        sending, by the control device, commissioning information to the N commissioning stations T times, wherein the N commissioning stations perform parallel optical power commissioning based on commissioning information received each time, and wherein T is an integer greater than 1; and wherein the method further comprises at least one of:
receiving, after each time of optical power commissioning performed by the N commissioning stations, a commissioning response fed back by each commissioning station, and querying real-time optical power information of the M to-be-commissioned services and an affected service;

receiving, after the N commissioning stations perform a $T1^{th}$ time of optical power commissioning, a commissioning response fed back by each commissioning station, and querying real-time optical power information of the M to-be-commissioned services and an affected service, wherein T1 is an integer greater than 1 and less than or equal to T;

receiving, after a cumulative adjustment amount of any one of the N commissioning stations reaches a first threshold, a commissioning response fed back by each commissioning station, and querying real-time optical power information of the M to-be-commissioned services and an affected service; or receiving, after a total cumulative adjustment amount of the N commissioning stations reaches a second threshold, a commissioning response fed back by each commissioning station, and querying real-time optical power information of the M to-be-commissioned services and an affected service.

2. The method according to claim 1, wherein the method further comprises:
receiving, by the control device, service optical performance data reported by W stations, wherein W is an integer greater than or equal to 1; and wherein the determining, by the control device, the M to-be-commissioned services on which optical power commissioning needs to be performed comprises determining, by the control device, the M to-be-commissioned services based on the service optical performance data reported by the W stations.

3. The method according to claim 1, wherein the M to-be-commissioned services correspond to X optical multiplex sections (OMSs), wherein X is an integer greater than or equal to 1, and wherein calculating, by the control device, before sending commissioning information to the N commissioning stations, at least one of an absolute total single-wavelength adjustment amount or a relative adjustment amount of each commissioning station comprises:
calculating, before the sending, by the control device, commissioning information to N commissioning stations, by the control device, for each of the X OMSs, at least one of an absolute total single-wavelength adjustment amount or a relative adjustment amount of each commissioning station.

4. The method according to claim 1, wherein the method further comprises, before the sending, by the control device, commissioning information to the N commissioning stations:
calculating, by the control device, for each of the N commissioning stations, at least one of a multiplexed-wavelength optical power adjustment amount or a single-wavelength optical power adjustment amount.

5. The method according to claim 4, wherein at least one of the multiplexed-wavelength optical power adjustment amount or the single-wavelength optical power adjustment amount meets at least one of:
optical power adjustment amounts, on a same commissioning station, of to-be-commissioned services passing through a same OMS section in the M to-be-commissioned services are offset in positive and negative directions that are less than or equal to a third threshold; or a co-directional cumulative optical power adjustment amount of N1 commissioning stations is less than or equal to a fourth threshold, wherein the N1 commissioning stations are commissioning stations on which a same to-be-commissioned service is located, the N1 commissioning stations are a subset of the N commissioning stations, and N1 is an integer greater than or equal to 1.

6. The method according to claim 1, wherein the method further comprises:
calculating, by the control device, an optical power adjustment amount of an affected service based on degradation amounts of the affected service before and after commissioning of the N commissioning stations, wherein the affected service represents a service affected by commissioning of the N commissioning stations.

7. The method according to claim 1, wherein the commissioning information comprises at least one of an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, or an optical power adjustment amount of the affected wavelength.

8. An optical power commissioning method, comprising:
reporting, by a commissioning station, service optical performance data to a control device;

receiving, by the commissioning station, commissioning information from the control device, wherein the commissioning information is used by N commissioning stations to perform parallel optical power commissioning, the N commissioning stations comprise the commissioning station, and N is an integer greater than or equal to 1, and wherein the commissioning information is received based on the control device calculating, before sending the commissioning information, at least one of an absolute total single-wavelength adjustment amount or a relative adjustment amount of each commissioning station; and performing, by the commissioning station, optical power commissioning based on the commissioning information;

wherein the receiving, by the commissioning station, commissioning information from the control device comprises receiving, by the commissioning station, commissioning information from the control device T times, wherein T is an integer greater than 1; and wherein the method further comprises at least one of:
feeding back a commissioning response to the control device after each time of optical power commissioning performed by the commissioning station;

feeding back a commissioning response to the control device after the commissioning station performs a $T1^{th}$ time of optical power commissioning, wherein T1 is an integer greater than 1 and less than or equal to T; or feeding back a commissioning response to the control device after a cumulative adjustment amount of the commissioning station reaches a first threshold.

9. The method according to claim 8, wherein the commissioning information comprises at least one of an optical amplifier gain, an optical amplifier gain adjustment amount, information about the commissioning station, an electrical variable optical attenuator loss value, an optical loss adjustment amount, a wavelength channel number of a to-be-commissioned wavelength, an optical power adjustment amount of the to-be-commissioned wavelength, a wavelength channel number of an affected wavelength, or an optical power adjustment amount of the affected wavelength.

10. A commissioning system, comprising
a control device configured to:
determine M to-be-commissioned services on which optical power commissioning needs to be performed, wherein M is an integer greater than or equal to 1; and
send commissioning information to N commissioning stations based on the M to-be-commissioned services, wherein the commissioning information is used by the N commissioning stations to perform parallel optical power commissioning, the N commissioning stations are stations on which the M to-be-commissioned services are located, and N is an integer greater than or equal to 1; and
calculate, before sending commissioning information to the N commissioning stations, at least one of an absolute total single-wavelength adjustment amount or a relative adjustment amount of each commissioning station; and
the N commissioning stations configured to:
perform optical power commissioning based on the commissioning information;
wherein the control device is further configured to send commissioning information to the N commissioning stations T times, wherein the N commissioning stations perform parallel optical power commissioning based on commissioning information received each time, and wherein T is an integer greater than 1; and
wherein the N commissioning stations are further configured to at least one of:
feed back commissioning responses to the control device after each time of optical power commissioning, and the control device is further configured to query real-time optical power information of the M to-be-commissioned services and an affected service based on the commissioning responses;
feed back commissioning responses to the control device after a $T1^{th}$ time of optical power commissioning, and the control device is further configured to query real-time optical power information of the M to-be-commissioned services and an affected service based on the commissioning responses, wherein T1 is an integer greater than 1 and less than or equal to T; or
feed back commissioning responses to the control device after a total cumulative adjustment amount reaches a second threshold, and the control device is further configured to query real-time optical power information of the M to-be-commissioned services and an affected service based on the commissioning responses; or
any one of the N commissioning stations is further configured to feed back a commissioning response to the control device after a cumulative adjustment amount reaches a first threshold, and the control device is further configured to query real-time optical power information of the M to-be-commissioned services and an affected service based on the commissioning response.

11. The commissioning system according to claim 10, wherein
the control device is further configured to receive service optical performance data reported by W stations, wherein W is an integer greater than or equal to 1; and
the control device is configured to determine the M to-be-commissioned services based on the service optical performance data reported by the W stations.

12. A control device, comprising:
a processor configured to determine M to-be-commissioned services on which optical power commissioning needs to be performed, wherein M is an integer greater than or equal to 1; and
a transceiver configured to send commissioning information to N commissioning stations based on the M to-be-commissioned services, wherein the commissioning information is used by the N commissioning stations to perform parallel optical power commissioning;
wherein the N commissioning stations are stations on which the M to-be-commissioned services are located, and wherein N is an integer greater than or equal to 1; and
wherein the processor is further configured to calculate, before the transceiver sends the commissioning information to the N commissioning stations, at least one of an absolute total single-wavelength adjustment amount or a relative adjustment amount of each commissioning station;
wherein the transceiver is further configured to send commissioning information to the N commissioning stations T times, wherein the N commissioning stations perform parallel optical power commissioning based on commissioning information received each time, and wherein T is an integer greater than 1; and
wherein the transceiver is configured to at least one of:
receive, after each time of optical power commissioning performed by the N commissioning stations, a commissioning response fed back by each commissioning station, and the processor is configured to query real-time optical power information of the M to-be-commissioned services and an affected service;
receive, after the N commissioning stations perform a T1th time of optical power commissioning, a commissioning response fed back by each commissioning station, and the processor is configured to query real-time optical power information of the M to-be-commissioned services and an affected service, wherein T1 is an integer greater than 1 and less than or equal to T;
receive, after a cumulative adjustment amount of any one of the N commissioning stations reaches a first threshold, a commissioning response fed back by each commissioning station, and the processor is configured to query real-time optical power information of the M to-be-commissioned services and an affected service; or
receive after a total cumulative adjustment amount of the N commissioning stations reaches a second threshold, a commissioning response fed back by each commissioning station, and the processor is configured to query real-time optical power information of the M to-be-commissioned services and an affected service.

13. The control device according to claim 12, wherein the transceiver is further configured to receive service optical performance data reported by W stations, wherein W is an integer greater than or equal to 1; and the processor is configured to determine the M to-be-commissioned services based on the service optical performance data reported by the W stations.

14. The control device according to claim 12, wherein the M to-be-commissioned services correspond to X optical multiplex sections (OMSs), and wherein X is an integer greater than or equal to 1, and wherein the processor being configured to calculate, before the transceiver sends the commissioning information to the N commissioning stations, at least one of an absolute total single-wavelength adjustment amount or a relative adjustment amount of each commissioning station comprises:

the processor being further configured to, before the sending, by the transceiver, commissioning information to the N commissioning stations, for each of the X OMSs, calculate at least one of an absolute total single-wavelength adjustment amount or a relative adjustment amount of each commissioning station.

15. The control device according to claim 12, wherein the processor is configured to, before the sending, by the transceiver, commissioning information to the N commissioning stations, for each of the N commissioning stations, calculate at least one of a multiplexed-wavelength optical power adjustment amount or a single-wavelength optical power adjustment amount.

16. The control device according to claim 15, wherein at least one of the multiplexed-wavelength optical power adjustment amount or the single-wavelength optical power adjustment amount meets at least one of:

optical power adjustment amounts, on a same commissioning station, of to-be-commissioned services passing through a same OMS section in the M to-be-commissioned services are offset in positive and negative directions that are less than or equal to a third threshold; and a co-directional cumulative optical power adjustment amount of N1 commissioning stations is less than or equal to a fourth threshold, wherein the N1 commissioning stations are commissioning stations on which a same to-be-commissioned service is located, the N1 commissioning stations are a subset of the N commissioning stations, and N1 is an integer greater than or equal to 1.

* * * * *

UNITED STATES PATENT AND TRADEMARK OFFICE
CERTIFICATE OF CORRECTION

PATENT NO. : 12,244,340 B2  
APPLICATION NO. : 17/981180  
DATED : March 4, 2025  
INVENTOR(S) : Li et al.

Page 1 of 1

It is certified that error appears in the above-identified patent and that said Letters Patent is hereby corrected as shown below:

In the Claims

In Column 57, in Claim 1, Line 2, delete "Tis" and insert -- T is --.

In Column 60, in Claim 12, Line 50, delete "T1th" and insert -- $T1^{th}$ --.

Signed and Sealed this  
Fifteenth Day of April, 2025

Coke Morgan Stewart  
*Acting Director of the United States Patent and Trademark Office*